US012561953B2

(12) United States Patent
Fenlon et al.

(10) Patent No.: US 12,561,953 B2
(45) Date of Patent: Feb. 24, 2026

(54) METHOD AND COMPUTING SYSTEM FOR TRAVELWAY FEATURE DETECTION AND REPORTING

(71) Applicant: Mercedes-Benz Group AG, Stuttgart (DE)

(72) Inventors: Tim Fenlon, Santa Clara, CA (US); Thomas Bilich, Menlo Park, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 429 days.

(21) Appl. No.: 18/078,164

(22) Filed: Dec. 9, 2022

(65) Prior Publication Data

US 2024/0193915 A1     Jun. 13, 2024

(51) Int. Cl.
*G06V 10/00* (2022.01)
*G06V 10/44* (2022.01)
*G06V 10/764* (2022.01)
*G06V 10/77* (2022.01)

(52) U.S. Cl.
CPC .......... *G06V 10/764* (2022.01); *G06V 10/454* (2022.01); *G06V 10/7715* (2022.01)

(58) Field of Classification Search
CPC ............... G06V 10/764; G06V 10/454; G06V 10/7715; G06V 10/82; G06V 20/56
See application file for complete search history.

(56) References Cited

U.S. PATENT DOCUMENTS

| | | | |
|---|---|---|---|
| 9,377,528 B2 | 6/2016 | Birken et al. | |
| 10,754,344 B2 | 8/2020 | Wolcott et al. | |
| 2019/0154442 A1* | 5/2019 | Annovi ................... | G01C 7/04 |

(Continued)

FOREIGN PATENT DOCUMENTS

| | | | | |
|---|---|---|---|---|
| CN | 106092617 A | * | 11/2016 | ......... G01M 17/007 |
| CN | 113932758 A | * | 1/2022 | |
| DE | 102011120022 | | 9/2012 | |

(Continued)

OTHER PUBLICATIONS

Ranyal et al, Road Condition Monitoring Using Smart Sensing and Artificial Intelligence: A Review, Sensors 22, 3044. (Year: 2022).*

(Continued)

*Primary Examiner* — Xiao Liu

(74) *Attorney, Agent, or Firm* — Dority & Manning, P.A.

(57) ABSTRACT

Methods and computing systems for travelway feature detection and reporting are presented. A control circuit may receive sensor data indicative of a feature within a travelway on which the vehicle is traveling and motion data indicative of a movement of a component of the vehicle associated with the feature. The control circuit may receive positioning data associated with a position of the vehicle within a first segment of the travelway. The control circuit may obtain travelway data for the first segment based on the positioning data. The control circuit may generate, using one or more machine-learned models, an output that is indicative of: a classification of the feature within the travelway and a location of the feature within the first segment of the travelway. The control circuit may transmit the output indicative of the classification of the feature and the location of the feature within the first segment.

20 Claims, 12 Drawing Sheets

600

602 RECEIVE SENSOR DATA INDICATIVE OF A FEATURE WITHIN A TRAVELWAY ON WHICH A VEHICLE IS TRAVELLING AND MOTION DATA INDICATIVE OF A MOVEMENT OF A COMPONENT OF THE VEHICLE ASSOCIATED WITH THE FEATURE

604 RECEIVE POSITIONING DATA OF THE VEHICLE, THE POSITIONING DATA BEING ASSOCIATED WITH A POSITION OF THE VEHICLE WITHIN A FIRST SEGMENT OF THE TRAVELWAY

606 OBTAIN TRAVELWAY DATA FOR THE FIRST SEGMENT BASED ON THE POSITIONING DATA

608 BASED ON THE SENSOR DATA, THE MOTION DATA, AND THE TRAVELWAY DATA, GENERATE, USING ONE OR MORE MACHINE-LEARNED MODELS, AN OUTPUT THAT IS INDICATIVE OF A CLASSIFICATION OF THE FEATURE WITHIN THE TRAVELWAY AND A LOCATION OF THE FEATURE WITHIN THE FIRST SEGMENT OF THE TRAVELWAY

610 TRANSMIT, TO A SERVER THAT IS REMOTE FROM THE VEHICLE, THE OUTPUT INDICATIVE OF THE CLASSIFICATION OF THE FEATURE AND THE LOCATION OF THE FEATURE WITHIN THE FIRST SEGMENT

(56)        References Cited

U.S. PATENT DOCUMENTS

2020/0026302  A1*    1/2020   Wolcott  ................ G06F 18/251
2023/0341239  A1*   10/2023   Ferencz  ............. G01C 21/3819

FOREIGN PATENT DOCUMENTS

| DE | 102019000403 | | 6/2019 |
| DE | 102019000403 | A1 * | 6/2019 |
| DE | 102020005185 | | 12/2020 |
| WO | WO 2020259892 | | 12/2020 |

OTHER PUBLICATIONS

Wang et al,The influence of locomotive primary longitudinal damp-
ing on wheel tread damage, 2016 Prognostics and System Health
Management Conference (PHM-Chengdu) (Year: 2016).*

* cited by examiner

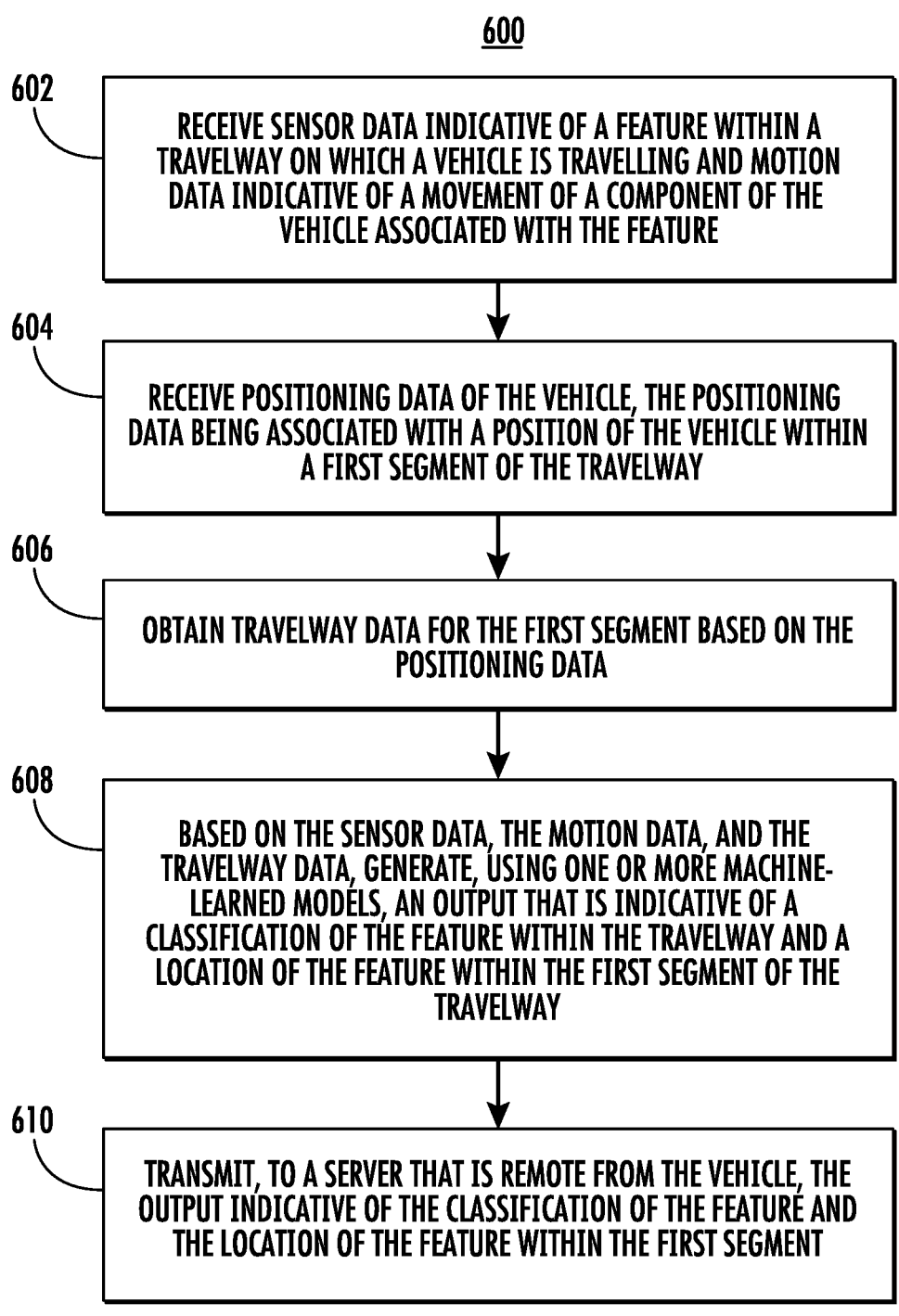

600

602

RECEIVE SENSOR DATA INDICATIVE OF A FEATURE WITHIN A TRAVELWAY ON WHICH A VEHICLE IS TRAVELLING AND MOTION DATA INDICATIVE OF A MOVEMENT OF A COMPONENT OF THE VEHICLE ASSOCIATED WITH THE FEATURE

604

RECEIVE POSITIONING DATA OF THE VEHICLE, THE POSITIONING DATA BEING ASSOCIATED WITH A POSITION OF THE VEHICLE WITHIN A FIRST SEGMENT OF THE TRAVELWAY

606

OBTAIN TRAVELWAY DATA FOR THE FIRST SEGMENT BASED ON THE POSITIONING DATA

608

BASED ON THE SENSOR DATA, THE MOTION DATA, AND THE TRAVELWAY DATA, GENERATE, USING ONE OR MORE MACHINE-LEARNED MODELS, AN OUTPUT THAT IS INDICATIVE OF A CLASSIFICATION OF THE FEATURE WITHIN THE TRAVELWAY AND A LOCATION OF THE FEATURE WITHIN THE FIRST SEGMENT OF THE TRAVELWAY

610

TRANSMIT, TO A SERVER THAT IS REMOTE FROM THE VEHICLE, THE OUTPUT INDICATIVE OF THE CLASSIFICATION OF THE FEATURE AND THE LOCATION OF THE FEATURE WITHIN THE FIRST SEGMENT

FIG. 6

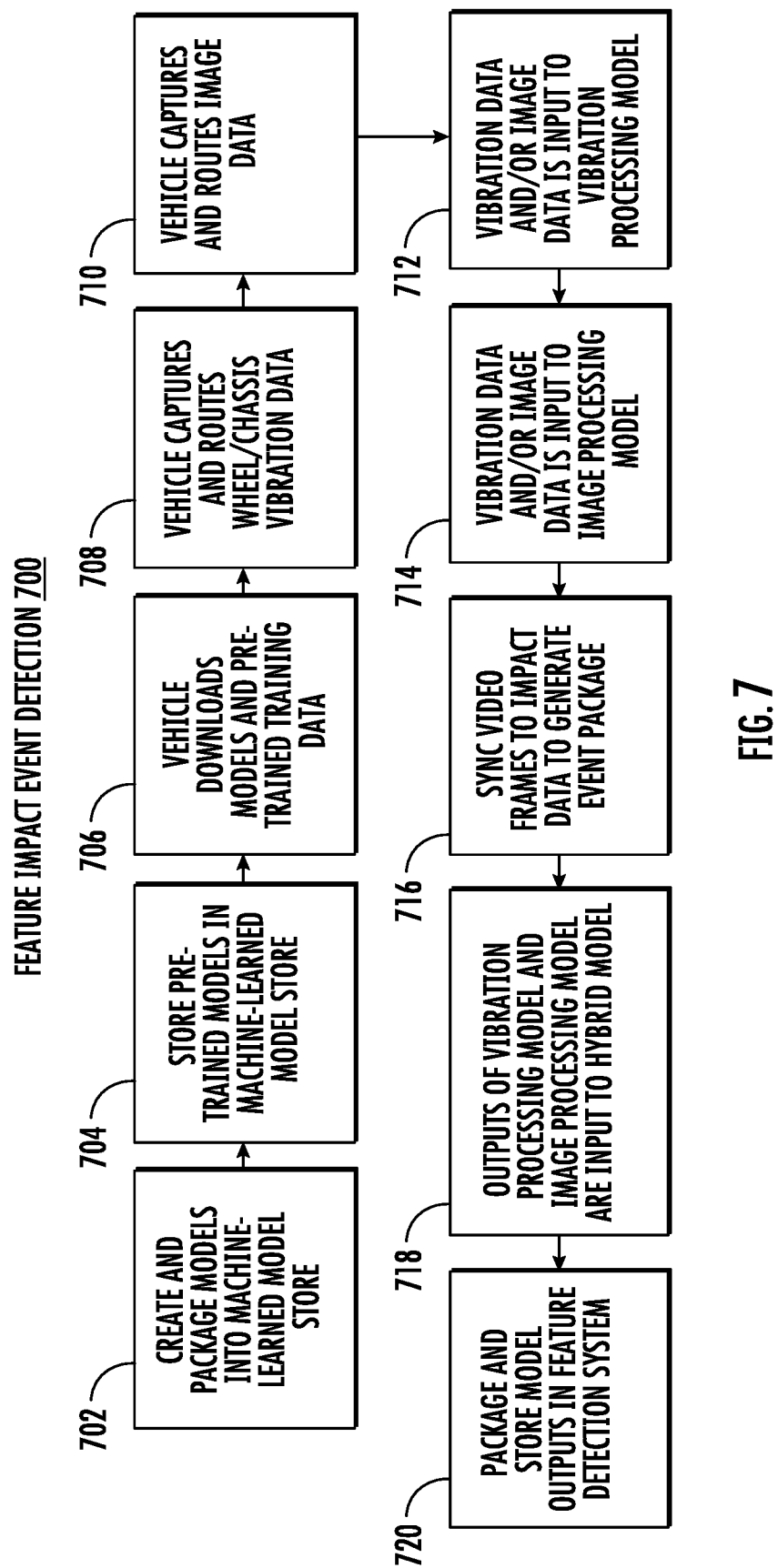

FEATURE IMPACT EVENT DETECTION 700

702 CREATE AND PACKAGE MODELS INTO MACHINE-LEARNED MODEL STORE

704 STORE PRE-TRAINED MODELS IN MACHINE-LEARNED MODEL STORE

706 VEHICLE DOWNLOADS MODELS AND PRE-TRAINED TRAINING DATA

708 VEHICLE CAPTURES AND ROUTES WHEEL/CHASSIS VIBRATION DATA

710 VEHICLE CAPTURES AND ROUTES IMAGE DATA

712 VIBRATION DATA AND/OR IMAGE DATA IS INPUT TO VIBRATION PROCESSING MODEL

714 VIBRATION DATA AND/OR IMAGE DATA IS INPUT TO IMAGE PROCESSING MODEL

716 SYNC VIDEO FRAMES TO IMPACT DATA TO GENERATE EVENT PACKAGE

718 OUTPUTS OF VIBRATION PROCESSING MODEL AND IMAGE PROCESSING MODEL ARE INPUT TO HYBRID MODEL

720 PACKAGE AND STORE MODEL OUTPUTS IN FEATURE DETECTION SYSTEM

FIG. 7

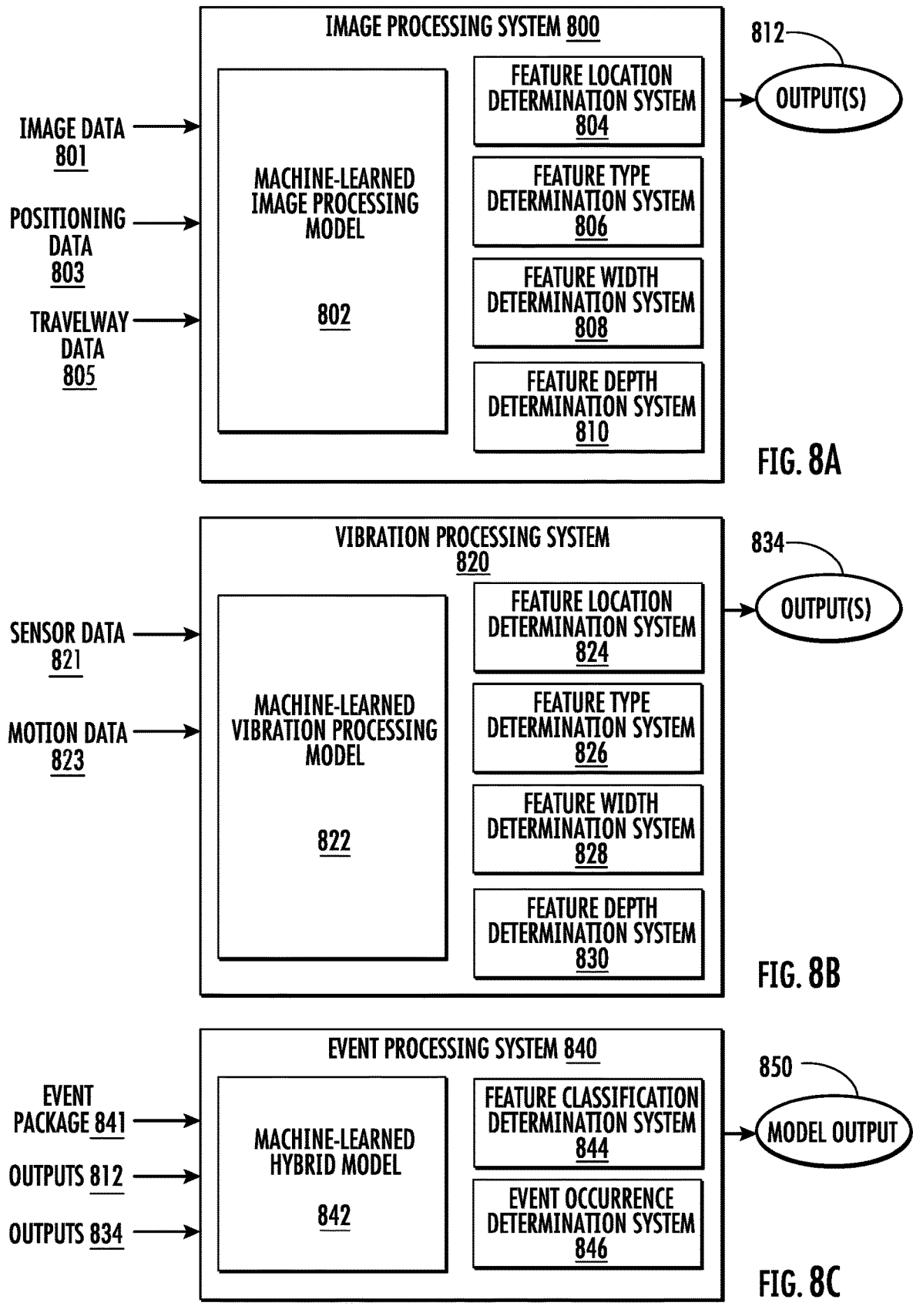

IMAGE PROCESSING SYSTEM 800

IMAGE DATA 801

POSITIONING DATA 803

TRAVELWAY DATA 805

MACHINE-LEARNED IMAGE PROCESSING MODEL

802

FEATURE LOCATION DETERMINATION SYSTEM 804

FEATURE TYPE DETERMINATION SYSTEM 806

FEATURE WIDTH DETERMINATION SYSTEM 808

FEATURE DEPTH DETERMINATION SYSTEM 810

812

OUTPUT(S)

FIG. 8A

VIBRATION PROCESSING SYSTEM 820

SENSOR DATA 821

MOTION DATA 823

MACHINE-LEARNED VIBRATION PROCESSING MODEL

822

FEATURE LOCATION DETERMINATION SYSTEM 824

FEATURE TYPE DETERMINATION SYSTEM 826

FEATURE WIDTH DETERMINATION SYSTEM 828

FEATURE DEPTH DETERMINATION SYSTEM 830

834

OUTPUT(S)

FIG. 8B

EVENT PROCESSING SYSTEM 840

EVENT PACKAGE 841

OUTPUTS 812

OUTPUTS 834

MACHINE-LEARNED HYBRID MODEL

842

FEATURE CLASSIFICATION DETERMINATION SYSTEM 844

EVENT OCCURRENCE DETERMINATION SYSTEM 846

850

MODEL OUTPUT

FIG. 8C

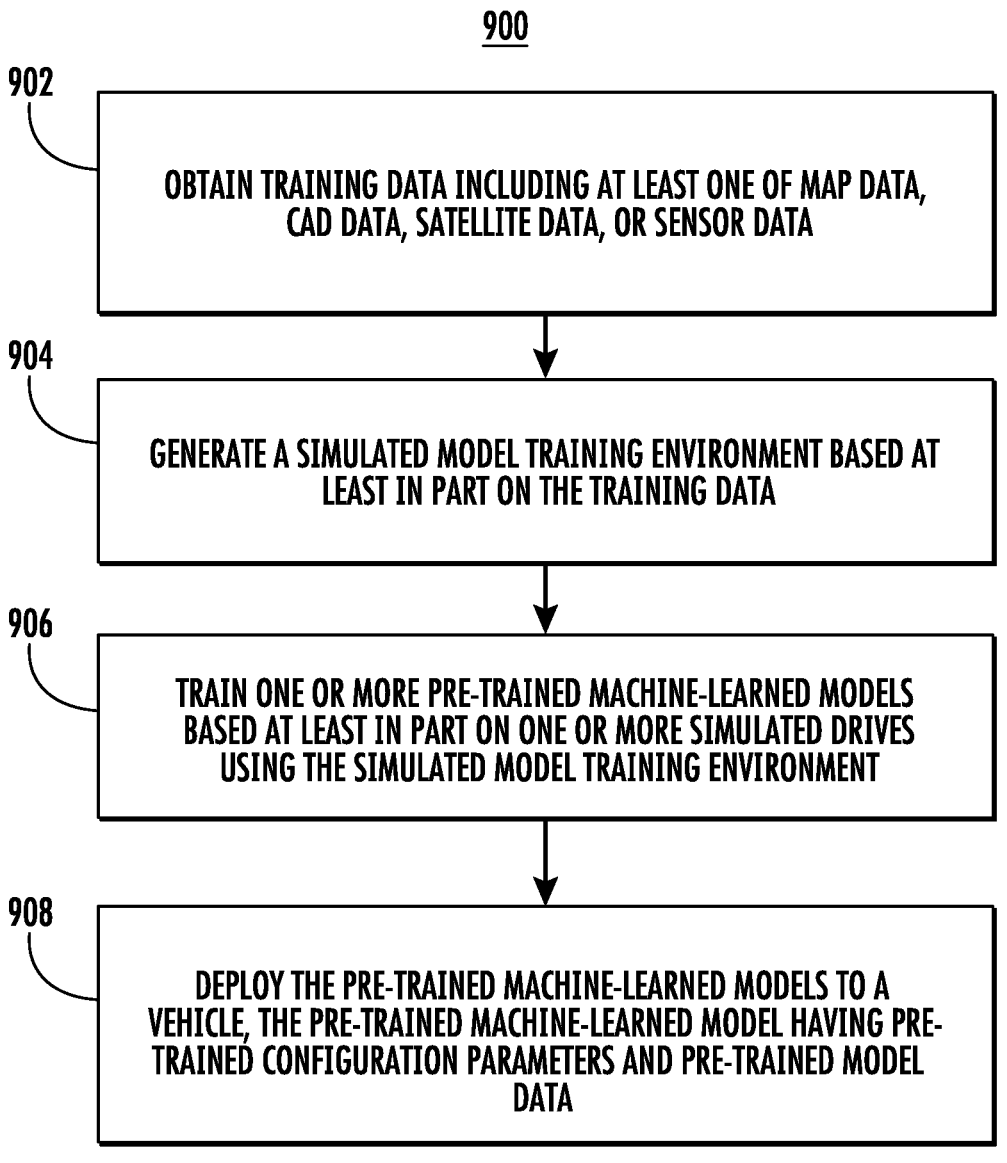

900

902

OBTAIN TRAINING DATA INCLUDING AT LEAST ONE OF MAP DATA, CAD DATA, SATELLITE DATA, OR SENSOR DATA

904

GENERATE A SIMULATED MODEL TRAINING ENVIRONMENT BASED AT LEAST IN PART ON THE TRAINING DATA

906

TRAIN ONE OR MORE PRE-TRAINED MACHINE-LEARNED MODELS BASED AT LEAST IN PART ON ONE OR MORE SIMULATED DRIVES USING THE SIMULATED MODEL TRAINING ENVIRONMENT

908

DEPLOY THE PRE-TRAINED MACHINE-LEARNED MODELS TO A VEHICLE, THE PRE-TRAINED MACHINE-LEARNED MODEL HAVING PRE-TRAINED CONFIGURATION PARAMETERS AND PRE-TRAINED MODEL DATA

FIG. 9

METHOD AND COMPUTING SYSTEM FOR TRAVELWAY FEATURE DETECTION AND REPORTING

FIELD

The present disclosure relates generally to methods and systems for travelway feature detection and reporting.

BACKGROUND

As road infrastructure ages, it is often subject to inclement weather, accidents, erosion, and other elements that may cause the infrastructure to develop defects. It is tasking for a municipality responsible for maintaining this infrastructure to manually discover these defects, especially for municipalities responsible for large tracts of infrastructure. Furthermore, existing approaches for automatically detecting defects often require costly dedicated systems that must be specially customized for the purpose of detecting infrastructure flaws. In addition, because of the limited availability and high cost of these systems, coverage available to municipalities using these systems may be inadequate, in some cases.

SUMMARY

Aspects and advantages of embodiments of the present disclosure will be set forth in part in the following description, or may be learned from the description, or may be learned through practice of the embodiments.

One example aspect of the present disclosure is directed to a computing system. The computing system may include a control circuit configured to perform operations. The operations may include receiving, via one or more sensors of a vehicle, sensor data indicative of a feature within a travelway on which the vehicle is traveling and motion data indicative of a movement of a component of the vehicle associated with the feature. The operations may further include receiving, via a positioning system of the vehicle, positioning data of the vehicle, the positioning data being associated with a position of the vehicle within a first segment of the travelway. The operations may further include obtaining travelway data for the first segment based on the positioning data. The operations may further include, based on the sensor data, the motion data, and the travelway data, generating, using one or more machine-learned models, an output that is indicative of a classification of the feature within the travelway and a location of the feature within the first segment of the travelway. The operations may further include transmitting, to a server that is remote from the vehicle, the output indicative of the classification of the feature and the location of the feature within the first segment.

In an embodiment, the feature indicated by the sensor data may include a surface defect on a surface of the travelway, and the component associated with the motion data may include a wheel in contact with the surface of the travelway.

In an embodiment, the sensor data may include image data captured via one or more cameras of the vehicle, and the one or more machine-learned models may include a machine-learned image processing model.

In an embodiment, the image data may include a first image obtained via a front camera, the front camera positioned at a front location of the vehicle and facing a forward direction relative to the vehicle, and a second image obtained via a rear camera, the rear camera positioned at a rear location of the vehicle and facing a rear direction relative to the vehicle.

In an embodiment, the image processing model may be a mask region-based convolutional neural network (R-CNN) that is trained to process the image data to determine at least one of: (i) a location of the feature, (ii) a type of the feature, (iii) a width parameter of the feature, or (iv) a depth parameter of the feature.

In an embodiment, the motion data may include vibration data indicative of a vibration of the component of the vehicle, and the one or more machine-learned models may include a machine-learned vibration processing model.

In an embodiment, the machine-learned vibration processing model may include a convolutional neural network (CNN) that is trained to process the vibration data to determine an impact force of the vehicle physically contacting the feature, and the machine-learned vibration processing model may be trained to use the impact force to determine at least one of: (i) a location of the feature, (ii) a type of the feature, (iii) a width parameter of the feature, or (iv) a depth parameter of the feature.

In an embodiment, the vibration data may include a first vibration value obtained via a first shock sensor associated with a first wheel of the vehicle, and a second vibration value obtained via a second shock sensor associated with a second wheel of the vehicle.

In an embodiment, the motion data may include acceleration data of the vehicle captured via an acceleration sensor of the vehicle.

In an embodiment, the one or more machine-learned models may include a machine-learned hybrid model that is trained to generate the classification of the feature based on an event defined by the sensor data and the motion data.

In an embodiment, an initiation of the event may be based on a time at which the feature is identified by a machine-learned image processing model based on the sensor data, and a termination of the event may be based on a time at which the feature is identified by a machine-learned vibration processing model based on the motion data.

In an embodiment, the server to which the computing system transmits the output may be configured to receive, from a second vehicle, a second classification of the feature located in the first segment, and wherein the travelway data for the first segment may be updated based on an aggregation of the classification and the second classification.

In an embodiment, the server to which the computing system transmits the output may be configured to perform at least one of the following: (i) transmit data indicative of the feature to a system for repair of the feature; (ii) transmit data indicative of a notification of the feature to a second vehicle; (iii) transmit data indicative of a route to avoid the feature; or (iv) verify that the feature has been addressed.

In an embodiment, the control circuit may be further configured to receive updated travelway data indicative of the classification of the feature and the location of the feature.

Another example aspect of the present disclosure is directed to a computer-implemented method. The computing system may perform a computer-implemented method, such as when a control circuit of the computing system executes instructions on one or more computer-readable media. The computer-implemented method may include receiving, via one or more sensors of a vehicle, sensor data indicative of a feature within a travelway on which the vehicle is traveling and motion data indicative of a movement of a component of the vehicle associated with the feature. The computer-implemented method may further include receiving, via a positioning system of the vehicle, positioning data of the vehicle, the positioning data being associated with a position of the vehicle within a first segment of the travelway. The computer-implemented method may further include obtaining travelway data for the first segment based on the positioning data. The computer-implemented method may further include, based on the sensor data, the motion data, and the travelway data, generating, using one or more machine-learned models, an output that is indicative of a classification of the feature within the travelway and a location of the feature within the first segment of the travelway. The computer-implemented method may further include transmitting, to a server that is remote from the vehicle, the output indicative of the classification of the feature and the location of the feature within the first segment.

Another example aspect of the present disclosure is directed to one or more non-transitory computer-readable media that store instructions that are executable by a control circuit. The instructions, when executed, may cause the control circuit to perform operations. The operations may include receiving, via one or more sensors of a vehicle, sensor data indicative of a feature within a travelway on which the vehicle is traveling and motion data indicative of a movement of a component of the vehicle associated with the feature. The operations may further include receiving, via a positioning system of the vehicle, positioning data of the vehicle, the positioning data being associated with a position of the vehicle within a first segment of the travelway. The operations may further include obtaining travelway data for the first segment based on the positioning data. The operations may further include, based on the sensor data, the motion data, and the travelway data, generating, using one or more machine-learned models, an output that is indicative of a classification of the feature within the travelway and a location of the feature within the first segment of the travelway. The operations may further include transmitting, to a server that is remote from the vehicle, the output indicative of the classification of the feature and the location of the feature within the first segment.

In an embodiment, the control circuit may be further configured to receive updated travelway data indicative of the classification of the feature and the location of the feature.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments hereof and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 illustrates a flowchart diagram of a method for feature detection according to example embodiments hereof.

FIG. 7 illustrates a flowchart diagram of a method for feature detection according to example embodiments hereof.

FIGS. 8A-8C illustrate block diagrams of example machine-learned models according to example embodiments hereof.

FIG. 9 illustrates a flowchart diagram of a method for training machine-learned models according to example embodiments hereof.

DETAILED DESCRIPTION

Overview

Figure 1:
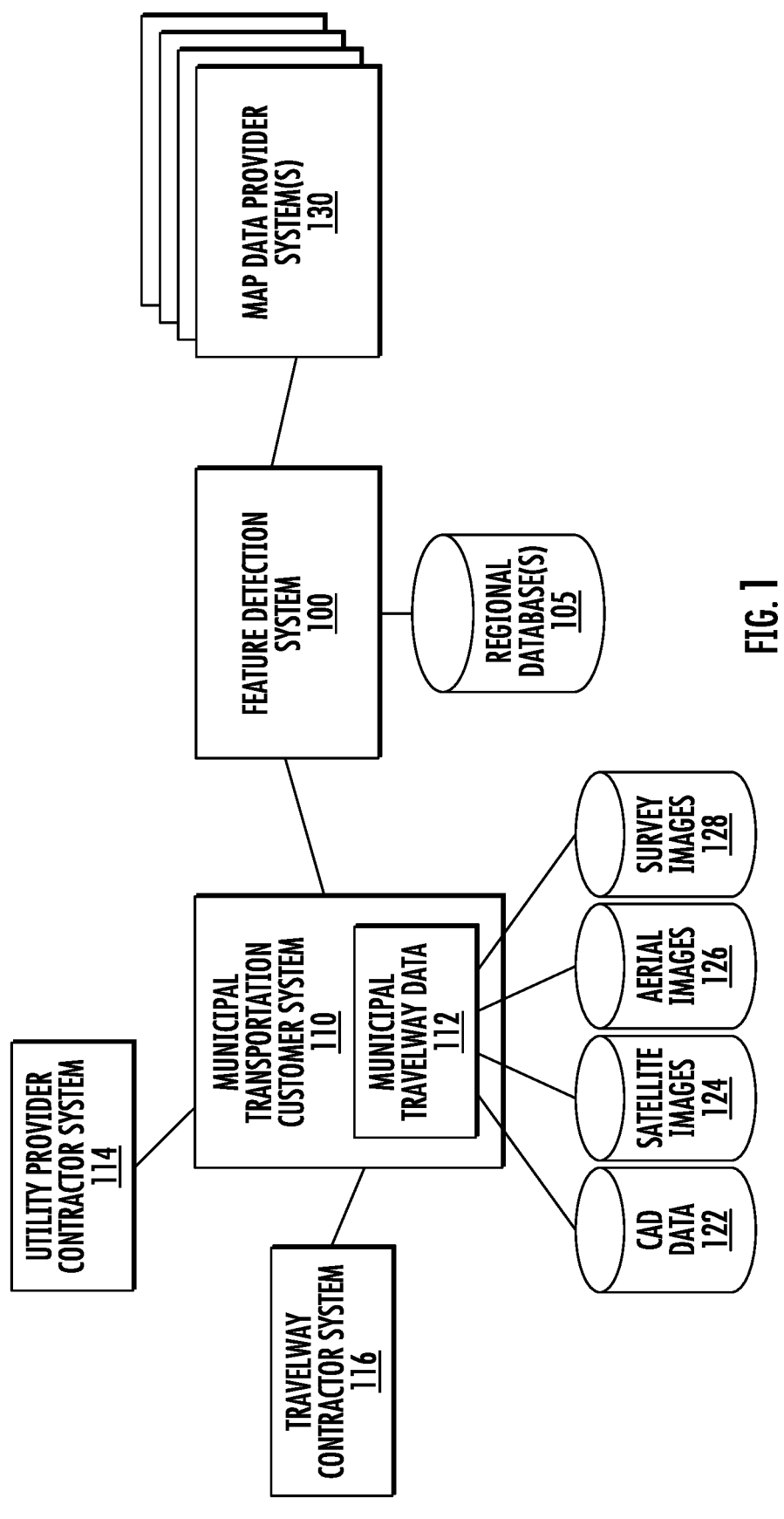
FIG. 1 illustrates a block diagram of an example feature detection system according to example embodiments hereof.

One aspect of the present disclosure relates to methods and systems for travelway feature detection and reporting. The road features may be hazard features, such as defects, flaws, cracks, absent or damaged signage, bridge collapses, and/or any other suitable features. The present disclosure provides for detecting and reporting these features to an appropriate authority (e.g., a municipality) using standard vehicles (e.g., vehicles which may be purchased by a general consumer) in near-real-time while simultaneously achieving the goal of protecting user privacy of those vehicle users. Automated and targeted data capture configurations may be pushed by a central feature detection system to some or all supported vehicles as available, which may increase the quality of detected features at coinciding locations. In addition, systems used for feature classification and anonymization may be remotely updateable, which may ensure strong functionality and privacy protection.

The present disclosure provides for utilizing sensors available on a vehicle (e.g., a consumer vehicle) to identify road defects, hazards, bridge defects, obstructions, collapses, and/or other features of a travelway. The vehicle may collect data along a travelway as the vehicle travels, including but not limited to data such as camera images, ultrasonic images, audio data, Light Detection and Ranging (LIDAR) data, Radio Detection and Ranging (RADAR) data, impact data, vibration data, acceleration data, and/or other data available to the vehicle. The collected data may be input to a machine-learned system including one or more machine-learned models, which may process the data to identify the desired features. The features may then be reported to an appropriate authority (e.g., in near-real-time) such that the authority may repair the travelway and/or take appropriate action in response to the features.

As used herein, a "travelway" refers to any suitable road, bridge, tunnel, route, path, paved surface, and/or other suitable infrastructure upon which and/or through which a vehicle may travel. The travelway may be or may have a surface upon which the vehicle may travel. For example, a road or bridge may have a road surface that supports a vehicle as it travels along the road or bridge. As another example, a tunnel may provide for a vehicle to travel through the tunnel by including a region generally sized to accommodate the vehicle as it passes through a mountain, bridge, wall, and/or other obstacle. The travelway may be demarcated or otherwise be provided with various markings, signage, supporting infrastructure, etc. that provides operators of vehicles with information about rules, regulations, boundaries, or other characteristics about the travelway. As an example, a road may include lane markings that indicate boundaries within which a vehicle may travel. As another example, a road or other travelway may include signage visible to operators of vehicles that conveys information about speed limits, warnings, mile markings, or other suitable information.

Notably, the present disclosure may provide for detecting and reporting features to a municipality using consumer vehicles in place of specialized vehicles. For instance, the present disclosure may be implemented using standard hardware on a consumer vehicle that is included on the consumer vehicle for the purposes of performing consumer functions. The consumer functions may be or may include, for example, automatic braking through cameras on a front portion of the vehicle, backup assist through rear cameras, lane navigation assistance through various cameras and/or other sensors on the vehicle, suspension adjustment to mitigate impact to the vehicle from objects and defects, identification of road conditions such as weather conditions, and/or other suitable consumer functions. In an embodiment, the present disclosure may be implemented on a consumer vehicle with no additional or minimal additional hardware requirements. Limited additional hardware requirements may facilitate providing systems and methods of the present disclosure with lowered cost and/or increased coverage availability.

Data collected by the vehicle may be processed on-board and/or off-board the vehicle. For instance, data from wheel impact sensors, cameras, etc. may be captured and stored on the vehicle. The data may be processed on the vehicle and/or remote from the vehicle using machine-learned models to identify features. The system may train the models using a simulated training environment to facilitate identification of features from existing data. The results of this processing may be sent to a central server and/or data store. The vehicle may anonymize the data to protect the identity of the vehicle reporting the feature.

In an embodiment, the machine-learned models may receive as input weather data, meteorological data, and/or similar data facilitating detection of weather conditions, such as conditions indicating the presence of water on a travelway, conditions indicating the presence of ice on the travelway, conditions indicating the presence of snow or slush, and/or other conditions. The use of meteorological data may support the machine-learned models in identifying features during abnormal weather conditions such as rain, snow, icy conditions, fog, and/or other abnormal weather conditions.

In an embodiment, the system may segment or otherwise divide a travelway into a plurality of segments of the travelway (also referred to herein as "travelway segments"). Each travelway segment may be associated with geospatial coordinate(s) that may be identifiable on a road map. For instance, the coordinate(s) may be identifiable on map databases, such as the Open Street Maps database. The road map and/or map database may define travelway segments and/or segment connection information descriptive of how segments connect to other segments. The system may further define lanes along a travelway. The lanes may be defined absolutely (e.g., lane 0, lane 1, etc.) and/or relatively (e.g., left lane, middle lane, right lane, merge lane, etc.). The lanes may be defined with respect to coordinates of the travel way. The system may further define quadrants or other subdivisions respective to each lane. If a travelway does not include multiple lanes, the system may determine edges of the travelway (e.g., a left edge and/or a right edge). The system may further divide the travelway into quadrants or other divisions based on the determined edges of the travelway.

In an embodiment, the travelway may be segmented into segments (e.g., squares) such that what is known about the physicality of the roadway is defined in terms of physical units. Segmenting or otherwise dividing the travelway may assist with making accurate measurements within the segments and the roadway at large. Travelway segments may be identified with varying degrees of accuracy, precision, and/or coverage. For instance, some travelway segments may be identified in relatively accurate and precise quadrants (e.g., segments closer to the vehicle) whereas other segments may be identified in larger, less accurate and/or less precise segments. The system may map sensor data from wheels, chassis, etc. to the known geography of the roadway. In this way the system may identify a segment of the roadway where a feature such as a pothole or bump exists. Further, in an embodiment the system may identify the relative depth of features such as potholes or bumps.

The system may further determine in which lane a particular feature is present. For example, the system (e.g., the vehicle) may determine which tire is engaged with a particular feature, such as a pothole, manhole, etc. The system may estimate which portion of a lane includes the feature based on the tire that engaged with the feature. For instance, the wheel interacting with the feature may generally indicate in which portion of the lane the feature is positioned (e.g., a left side of the lane vs. a right side of the lane). In addition and/or alternatively, the system may estimate a location of the feature (e.g., a coordinate associated with the feature) based on a position of the vehicle (e.g., from a positioning system such as a GPS) when the vehicle interacts with the feature. The vehicle may report the location and/or the lane of the feature and related feature identification data (e.g., a predicted type of the feature) to the appropriate authority.

In an embodiment, the vehicle may determine whether a heavy braking event or anti-lock braking event has occurred, which may be indicative of an object or fault in a travelway. The system may utilize this determination to identify objects in the travelway, such as objects that cause the vehicle operator to perform an evasive course change, hard brake, or other maneuver to avoid the objects.

Example aspects of the present disclosure provide a number of technical effects and benefits. As one example, the present disclosure facilitates improvements to computing technology by enabling a computing system, such as a system onboard a vehicle, to detect and report a feature, such as a hazard feature. The use of multiple machine-learned models, such as an image processing model, a vibration processing model, and/or a hybrid model may provide for a division of computing tasks between an onboard system and a remote system, such as a feature detection system. Because some of the computing tasks may be performed remote from the vehicle at generally stronger computing systems, onboard processing requirements may be reduced. Therefore, feature detection may be implemented on consumer vehicles, such as vehicles lacking extraneous hardware components for feature detection. By incorporating aspects of the present disclosure for consumer vehicles, the present disclosure may beneficially provide for a reduced computing resource requirement for feature detection and a reduced cost associated with vehicles capable of performing feature detection and reporting. This, in turn, may provide for increased feature data collection over a wider reach and improve travelway quality throughout a municipality.

Example Systems

With reference now to the figures, example embodiments hereof will be discussed in further detail.

FIG. 1 illustrates a block diagram of an example feature detection system 100 according to example embodiments hereof. The feature detection system 100 may be implemented by a server computing system, such as a cloud server system. The feature detection system 100 may include and/or may be in communication with one or more regional database(s) 105 that store data descriptive of travelway features associated with a geographic region. For example, the regional database(s) 105 may store data descriptive of features, including models of physical objects, such as bridges, roads, man-hole cover locations, survey location data and/or other landmark types of data, and/or other static data that describes objects within the geophysical boundaries of a city, town, county, or other municipality. The regional database(s) 105 may be static (e.g., populated with unchanging, static data) and/or dynamic (e.g., wherein updates from other providers are propagated through the dynamic data).

The feature detection system 100 may communicate with a municipal transportation customer system 110. The municipal transportation customer system 110 may be owned, operated by, controlled by, and/or otherwise associated with a municipal customer. The municipal customer may be a city, county, state, government, and/or other municipality that is responsible for establishing and/or maintaining travelways such as roads, bridges, tunnels, and/or other road infrastructure. The municipal transportation customer system 110 may include or may be in communication with systems storing municipal travelway data 112 describing travelways such as roads, bridges, construction projects, etc. managed by the municipal customer. Additionally and/or alternatively, the municipal transportation customer system 110 may be in communication with a utility provider contractor system 114 that provides information related to utility infrastructure and/or a travelway contractor system 116 that provides information related to travelway infrastructure.

In an embodiment, the municipal travelway data 112 may include computer-aided design (CAD) data 122 and/or static mechanical data which describes bridges, roads, and other landmarks within the municipal customer's geo-physical domain. The CAD data 122 may be exported to a standard format that the feature detection system 100 may interpret. Additionally, in an embodiment, the feature detection system 100 may maintain a local copy of the CAD data 122 received from the municipal transportation customer system 110. Where available, CAD data 122 associated with a particular stretch of travelway may contain static mechanical data, max load, length, width of roadway, survey data from survey points, etc., where these points may be identified and converted into a standard description format for roads and bridges.

In an embodiment, the municipal travelway data 112 may include satellite images 124 and/or aerial images 126. The satellite images 124 and/or aerial images 126 may be taken above looking directly down on roads, bridges, and other landmarks. In an embodiment, satellite images may be available from map data provider system(s) 130. The satellite images 124 and/or aerial images 126 may be updated as more recent satellite or aerial images become available. The satellite images 124 and/or aerial images 126 may capture visual information about features such as potholes, bumps, and other physical hazards/obstacles that may be presented to a vehicle traveling along the travelways.

In an embodiment, the municipal travelway data 112 includes survey data 128. The survey data 128 may include three-dimensional data, such as stereoscopic representations of three-dimensional objects from the aerial images 126. The aerial images 126 and/or corresponding survey data 128 may be imported into the feature detection system 100 (e.g., into the regional database(s) 105). In an embodiment, drones, planes, and/or satellites may be fitted with three-dimensional cameras to capture the satellite images 124, the aerial images 126, and/or the survey data 128.

In an embodiment, the feature detection system 100 may communicate with one or more map data provider system(s) 130. The map data provider system(s) 130 may provide two-dimensional and/or three-dimensional map data of travelways within a region, such as within a region serviced by the municipal customer. The map data provider system(s) 130 may be owned, operated by, maintained by, and/or otherwise associated with a geographical mapping entity, such as a map data provider.

The feature detection system 100 may create a model (e.g., a three-dimensional model) of a municipality using the municipal travelway data 112 and/or map data. The model may depict existing features, such as potholes, manholes, or other hazards and landmarks, that may be identified using machine learning models on a vehicle. For instance, the model of the municipality may be implemented by a simulator to produce a simulated environment resembling the municipality. A machine learning model may identify a feature (e.g., a pothole or manhole) from a simulated drive along the simulated environment. In an example, the simulator may simulate what the feature would look like as a simulated vehicle drives along a particular stretch of travelway.

In an embodiment, the database(s) 105 may include a local static and/or dynamic store of data from the municipal transportation customer system 110 and/or map data provider system(s) 130. For instance, in an embodiment, the feature detection system 100 may import data from the municipal transportation customer system 110 and/or map data provider system(s) 130 into the database(s) 105 upon initialization and/or intermittently (e.g., at regular intervals). The data may be imported in its original format and/or reformatted to conform to internal formatting requirements of the database(s) 105 and/or the feature detection system 100. As an example, three-dimensional mesh drawings may be imported using a standard three-dimensional object format. As another example, supplemental data for a travelway, such as mechanical data, length, width of roadway, survey data, etc. may be converted into a standard description format for a travelway upon import.

In an aspect, the feature detection system 100 may include, or otherwise leverage, one or more machine-learned models to perform its operations and functions. For instance, the feature detection system 100 may store, communicate with, and/or otherwise utilize one or more machine-learned models. The one or more machine-learned models may be or may include any suitable machine-learned models, such as neural networks, convolutional neural networks, RCNN object detection models, computer vision models, hybrid models, and/or any other suitable models, and/or combinations thereof. For instance, the machine-learned model(s)

may be trained to detect features on a travelway upon which a vehicle travels, as will be further described herein.

In an embodiment, a model trainer may train the machine-learned models on the simulated environment and subsequently deploy the pre-trained models to a vehicle for inference. The model trainer may perform inference on our machine learning model in the actual vehicle while the driver is actually traveling along the roadway. This provides a method of using simulated modeling to train a machine-learned model that may be used on-board a vehicle to identify features on a real travelway. This process is described in more particularity throughout the present disclosure, such as with respect to FIG. 9.

Figure 2A:
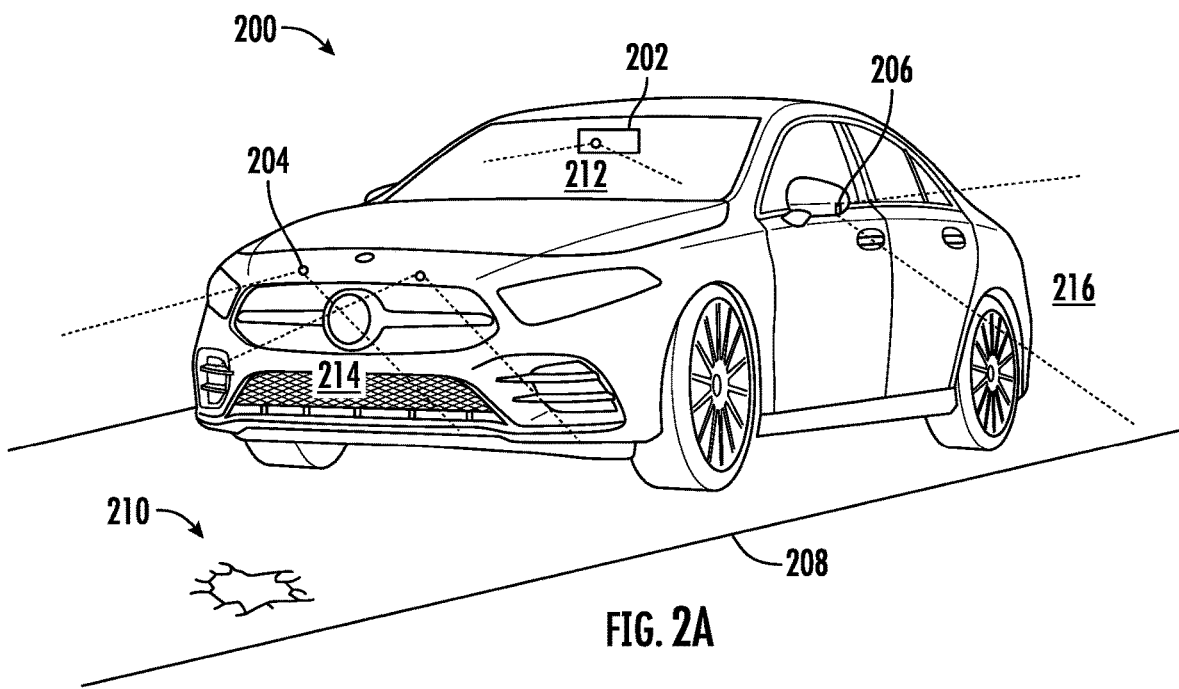
FIGS. 2A-2B illustrate a vehicle traveling along a roadway according to example embodiments hereof.
Figure 2B:
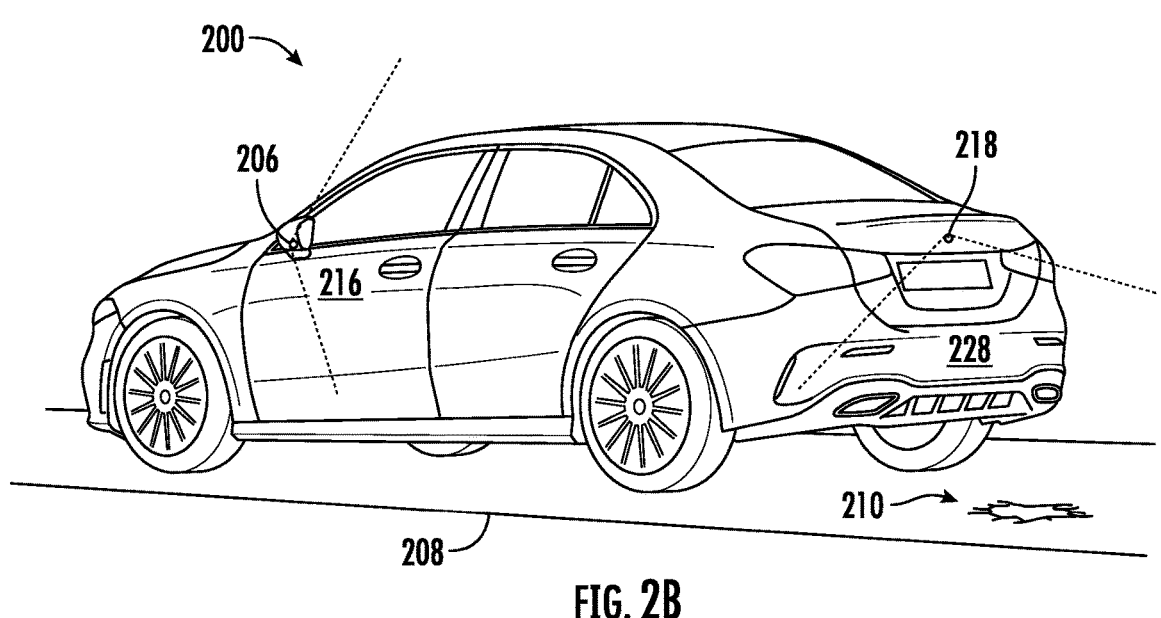

FIGS. 2A-2B illustrate a vehicle 200 traveling along a travelway 208 according to example embodiments hereof. The vehicle 200 may include a plurality of cameras, including dash camera 202, hood cams 204, mirror cams 206, and rear cams 218. In an aspect, more or fewer cameras may be included on vehicle 200. Each of the cameras may have an associated field of view. For instance, dash camera 202 may have a field of view 212, hood cams 204 may have fields of view 214, mirror cams 206 may have fields of view 216, and rear cams 218 may have fields of view 228. In an embodiment, some of the cameras of the vehicle 200, such as cameras 202, 204, 306, 316, may front cameras, which may be cameras positioned at a front location of the vehicle 200 and/or facing a forward direction relative to the vehicle. In this embodiment, some of the cameras of the vehicle 200, such as cameras 218, 318, may be rear cameras, which may be cameras positioned at a rear location of the vehicle 200 and/or facing a rear direction relative to the vehicle 200.

The cameras may operate in tandem to capture images from complementary regions in the environment of vehicle 200. For instance, as illustrated in FIGS. 2A-2B, the complementary fields of view of the cameras may provide for the vehicle 200 to track a feature 210 (e.g., a pothole) at varying times along a drive of the vehicle 200. In FIG. 2A, the feature 210 may be positioned in front of the vehicle 200 such that the dash camera 202 and/or the hood cams 204 may observe the feature 210. As the vehicle drives along the travelway 208, the vehicle may eventually arrive at the position depicted in FIG. 2B, in which the feature 210 is positioned behind the vehicle 200. The rear camera 218 may then observe the feature 210. In this way, the vehicle 200 may track the feature 210 at various points along its drive and from varying perspectives, which may facilitate the collection of data relating to feature 210.

In an embodiment, the dash camera 202, the hood cam(s) 204, the mirror cams 206, and/or the rear cams 218 may each have unique machine-learned models. For instance, a first model may be designed and/or trained for the dash camera 202 whereas a second model may be designed and/or trained for the mirror cams 206. The unique models for each camera may be trained using training data from the perspective of the associated camera. For instance, a mirror camera model may be trained using training data from mirror cams 206 (and/or similarly situated cameras on other vehicles). In this way, the machine-learned models may accurately track the feature 210 at each camera.

Figure 3:
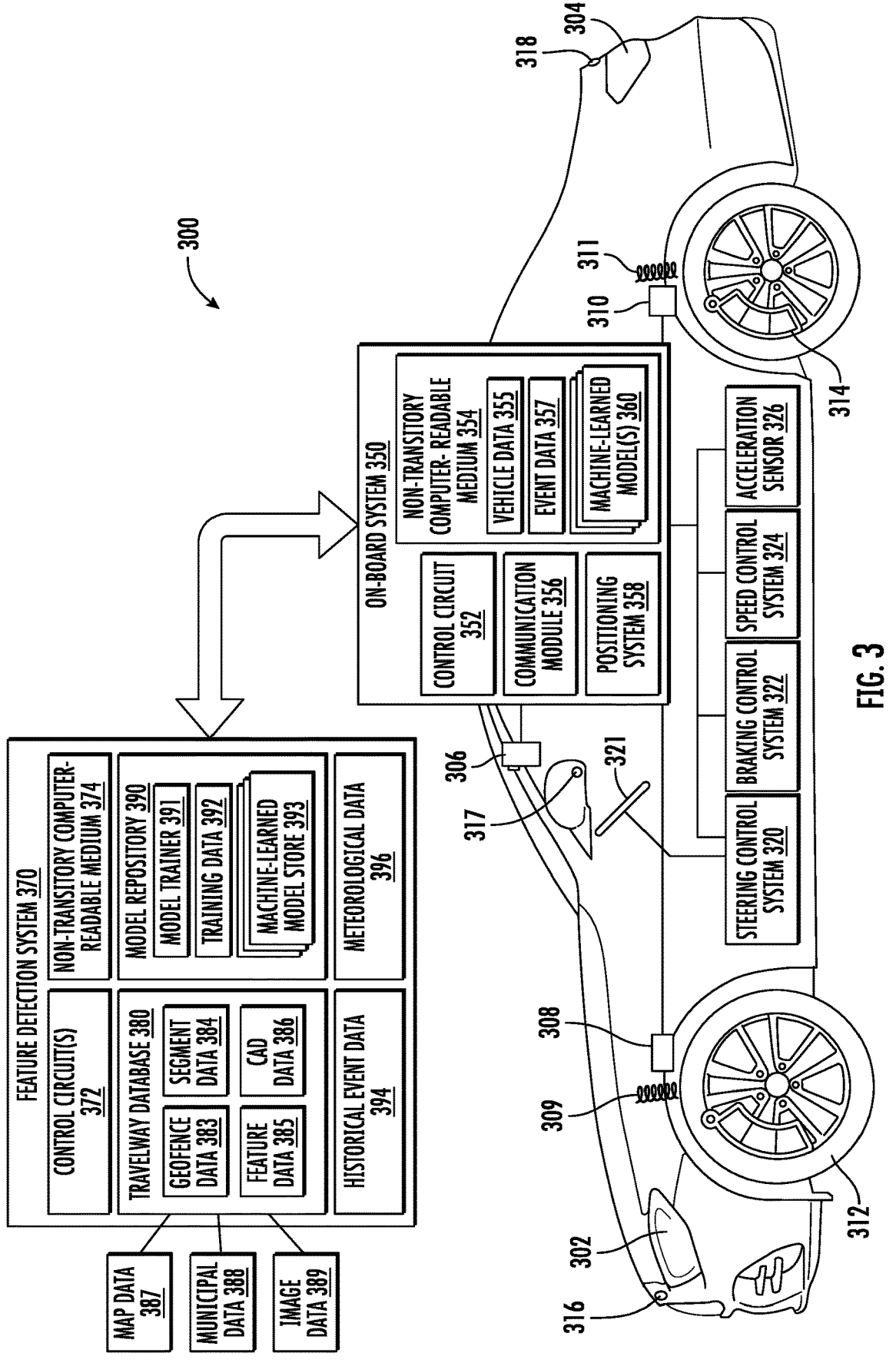
FIG. 3 illustrates a block diagram of an example vehicle and feature detection system according to example embodiments hereof.

FIG. 3 illustrates a block diagram of an example vehicle 300 and feature detection system 370 according to example embodiments hereof. The feature detection system 370 and the vehicle 300 may represent the same systems as the feature detection systems and vehicles depicted in other figures (e.g., FIGS. 1 and 2).

The vehicle 300 may be a vehicle configured to identify and/or report features, such as hazard features, according to example aspects of the present disclosure. The vehicle 300 may be a vehicle that is operable by a user. In an embodiment, the vehicle 300 may be an automobile or another type of ground-based vehicle that is manually driven by a user. For example, the vehicle 300 may be a Mercedes-Benz® car or van. The vehicle 300 may include operator-assistance functionality such as cruise control, advanced driver assistance systems, etc. In some implementations, the vehicle 300 may be a fully or semi-autonomous vehicle.

The vehicle 300 may include a power train and one or more power sources. The power train may include a motor, e-motor, transmission, driveshaft, axles, differential, e-components, gear, etc. The power sources may include one or more types of power sources. For example, the vehicle 300 may be a fully electric vehicle (EV) that is capable of operating a powertrain of the vehicle 300 (e.g., for propulsion) and the vehicle's onboard functions using electric batteries. In an embodiment, the vehicle 300 may use combustible fuel. In an embodiment, the vehicle 300 may include hybrid power sources such as, for example, a combination of combustible fuel and electricity. In an aspect, the vehicle 300 may be a commercially available consumer vehicle.

Routine and conventional components of vehicle 300 (e.g., an engine, passenger seats, windows, tires and wheels) are not illustrated and/or discussed herein for the purpose of brevity. One of ordinary skill in the art will understand the operation of conventional vehicle components in vehicle 300.

The vehicle 300 may include a front location and/or a rear location. The vehicle may include one or more driving lights, such as headlights 302 and/or rear lights 304 The vehicle 300 may include a front suspension 309 and/or a rear suspension 311. The front suspension 309 may be fitted with a vibration sensor 308. The vibration sensor 308 may record vibration data descriptive of vibrations, impacts, and/or other forces acting on the front suspension 309. Similarly, the rear suspension 311 may be fitted with a vibration sensor 310 that records vibration data at the rear suspension 311. It should be understood that the vibration sensors 308, 310 may be associated with an individual wheel, with an axle, and/or with any other suitable component of the vehicle 300.

The vehicle 300 may include a front brake 312 and/or a rear brake 314. The brakes 312, 314 may be operable to reduce a rotational speed of the wheels of the vehicle 300. The brakes 312, 314 may be controlled by a braking control system 322 of the vehicle 300. In an embodiment, the braking control system 322 may identify heavy braking events, loss of traction while braking, and/or other abnormal braking events and engage an anti-lock braking system (not illustrated) and/or other suitable remedial systems. In addition to facilitating control of the vehicle 300, the detections from the braking control system 322 may provide valuable insight as to the presence of features in the road (e.g., obstructions) that severely affect the vehicle 300 as it navigates a travelway.

The vehicle 300 may include various systems for controlling the vehicle 300 and/or obtaining or generating motion data relating to the vehicle 300. For example, the vehicle 300 may include one or more sensors (e.g., a vibration sensor, such as a shock sensor mounted on a suspension of the vehicle) that are configured to generate motion data that describe or are otherwise indicative of movement of a component of the vehicle 300. In this example, the component may be a wheel which is in contact with a surface of a travelway (e.g., a road surface). The sensor in this example may be a vibration sensor which generates motion data, or more particularly vibration data, that indicates how much vertical motion the wheel is experiencing as the wheel is traveling on the road surface. In an embodiment, the vehicle 300 may include a steering control system 320. A driver may interact with a steering wheel 321 to control a heading of the vehicle 300. In response to the driver's interaction with the steering wheel 321, the steering control system 320 may adjust a direction of one or more components of the vehicle 300 to steer the vehicle 300. Additionally and/or alternatively, the vehicle 300 may include a speed control system 324 that controls a speed of the vehicle 300. For instance, a driver may interact with a throttle, gas pedal, and/or other interface to cause the vehicle 300 to accelerate and/or decelerate. Additionally and/or alternatively, the vehicle 300 may include a cruise control system or other automated system to maintain, adjust, or otherwise affect the speed of the vehicle 300. The speed control system 324 may report a current speed of the vehicle 300. Furthermore, the vehicle 300 may include an acceleration sensor that reports a current acceleration of the vehicle 300. In an embodiment, the vehicle 300 may include a positioning system, such as a GPS system, which is configured to generate positioning data associated with a position of the vehicle 300. For example, the positioning data may include geographic coordinates indicative of an estimated location of the vehicle 300.

The vehicle 300 may include one or more cameras disposed on and/or within the vehicle 300. For instance, the vehicle 300 may include one or more dash cameras 306, one or more hood cams 316, one or more mirror cams 317, one or more rear cams 318, and/or any other suitable cameras. The camera(s) 306, 316, 317, 318 may capture image data and/or video data depicting an environment of the vehicle 300 during operation. The camera(s) 306, 316, 317, 318 may capture video data in any suitable format. As one example, the camera(s) 306, 316, 317, 318 may capture video data as a stream of images in any suitable image format, such as JPEG, BMP, PNG, etc. and/or any suitable proprietary formats. As another example, the camera(s) 306, 316, 317, 318 may capture video data in any suitable video format, such as MP4, AVI, AVCHD, DV, etc. and/or any suitable proprietary formats.

The vehicle 300 may include an on-board system 350. The on-board system 350 may be a computing system configured to perform some or all operations for feature detection and/or reporting as described herein. The on-board system 350 may include a control circuit 352. In an embodiment, the control circuit 352 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 352 and/or on-board system 350 may be part of, or may form, a vehicle control unit (also referred to as a vehicle controller) that is embedded or otherwise disposed in the vehicle 300 (e.g., a Mercedes-Benz car or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, or any other controller (the term "or" and "and/or" may be used interchangeably herein).

In an embodiment, the on-board system 350 may include a non-transitory computer-readable medium 354 (also referred to as memory 354). The non-transitory computer-readable medium 354 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 354 may store computer-executable instructions or computer-readable instructions, such as instructions to perform the method 600 of FIG. 6.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 352 to perform one or more functional tasks. The modules and computer-readable/executable instructions may be described as performing various operations or tasks when a control circuit or other hardware component is executing the modules or computer-readable instructions.

In an embodiment, the non-transitory computer-readable medium 354 may store vehicle data 355 that describes aspects of the vehicle, such as make, model, year, serial number, software/firmware versions, and/or other vehicle aspects. In an embodiment, the non-transitory computer-readable medium 354 may store event data 357. The event data 357 may describe interactions with features, such as reportable events. For instance, the event data 357 may include information such as which component of the vehicle 300 interacted with the feature, sensor data from sensor(s) associated with that component, timestamps associated with the event data, positioning data associated with the event, and/or other suitable data for recording and/or reporting interactions with features of a travelway.

The on-board system may include or may be in communication with a positioning system 358. The positioning system 358 may be any suitable positioning system and/or combinations thereof. As one example, the positioning system 358 may be or may include a satellite positioning system, such as GPS or GLONASS. As another example, the positioning system 358 may segment a travelway into a plurality of travelway segments. The positioning system 358 may output positioning data describing which travelway segment(s) the vehicle 300 is located or positioned within. For instance, the positioning system 358 may compare coordinates (e.g., satellite coordinates) of the vehicle 300 to coordinates associated with travelway segments to identify which segments the vehicle 300 is positioned within. Additionally and/or alternatively, the positioning system 358 may utilize computer vision techniques, such as lane recognition techniques, to identify which lane and/or segment of a travelway the vehicle 300 is positioned within.

The on-board system may store, communicate with, and/or otherwise utilize one or more machine-learned models 360. The one or more machine-learned models 360 may be or may include any suitable machine-learned models, such as neural networks, convolutional neural networks, RCNN object detection models, computer vision models, hybrid models, and/or any other suitable models, and/or combinations thereof.

In an embodiment, the one or more machine-learned models 360 may be or may include a machine-learned image processing model. The image processing model may be or may include a mask region-based convolutional neural network (R-CNN) that is trained to process the image data to determine at least one of: (i) a location of the feature, (ii) a type of the feature, (iii) a width parameter of the feature, or (iv) a depth parameter of the feature. In an embodiment, a unique image processing model may be associated with a given camera on the vehicle 300. For instance, a first image processing model may be associated with a first camera on the vehicle 300 whereas a second image processing model may be associated with a second camera on the vehicle 300. The model associated with the camera may be trained based on training data from that camera or from a similarly positioned camera on other vehicles. Additionally, the model may operate primarily or exclusively on image data from the associated camera. As one example, a machine-learned model 360 may be or may include a mask RCNN computer vision model that is trained to identify objects in image data and/or video data. The model may be trained to identify features including road landmarks, such as manholes, potholes, bridges, mile markers, potholes, rocks, uneven roads, and/or other features.

In an embodiment, the one or more machine-learned models 360 may be or may include a machine-learned vibration processing model. The machine-learned vibration processing model may be a convolutional neural network (CNN) that is trained to process the vibration data to determine an impact force of the vehicle physically contacting the feature. The machine-learned vibration processing model may be trained to use the impact force to determine at least one of: (i) a location of the feature, (ii) a type of the feature, (iii) a width parameter of the feature, or (iv) a depth parameter of the feature. As an example, a machine-learned model 360 may be or may include a convolutional neural network that utilizes forces detected by an impact of a tire passing over an object to determine a type of object that the tire passed over. In an embodiment, material on the wheel may be used to detect regions of contact with tire rubber and the travelway and/or feature.

In an embodiment, the one or more machine-learned models 360 may be or may include a machine-learned hybrid model that is trained to generate the classification of the feature based on an event defined by the sensor data and the motion data. For instance, the hybrid model may be used to generate a probability of a specific object detection and impact. An initiation of the event may be based on a time at which the feature is identified by a machine-learned image processing model based on the sensor data. Additionally and/or alternatively, a termination of the event may be based on a time at which the feature is identified by a machine-learned vibration processing model based on the motion data. In an embodiment, a beginning of the event starts when a particular feature is within a certain range of the vehicle 300. The event may end after the vehicle 300 makes contact with the feature. Video data and/or image data from the cameras 306, 316, 317, 318 on the vehicle 300 that witness the event may be stored in the non-transitory computer-readable medium 354 (e.g., temporarily) after being processed by the image processing model. Vehicle wheel force data from the start of the event to the end of the event may also be stored in non-transitory computer-readable medium 354 (e.g., temporarily) after processing from the vibration processing model. The hybrid model may use the event data in a hybrid Mask-RCNN/CNN model to evaluate both image sequences as well as wheel force data to determine what object was encountered during the event. Multiple events may overlap in time, so a first event and/or a second event corresponding to unique features may share some timeline.

In an embodiment, the on-board system 350 may process the video data received from the cameras 306, 316, 317, 318 on the vehicle 300 to remove private information, such as pedestrian features, license plate numbers, etc. The on-board system 350 may process the video data to remove the private information before any of the data, encrypted or otherwise, is transmitted off of the vehicle 300 and/or used in any meaningful way. Thus, the vehicle 300 may preserve the privacy of its occupants as well as surrounding persons.

The on-board system 350 may communicate with a feature detection system 370 that is remote from the vehicle 300. For instance, the feature detection system 370 may be or may include a remote server. The feature detection system 370 may be a computing system that includes one or more control circuits 372. In an embodiment, the control circuit(s) 372 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit.

In an embodiment, the feature detection system 370 may include a non-transitory computer-readable medium 374 (also referred to as memory 374). The non-transitory computer-readable medium 374 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The feature detection system 370 may implement or otherwise provide services that facilitate feature detection and/or reporting according to aspects of the present disclosure. The feature detection system 370 may store and/or be in communication with systems storing various data used in identifying and/or reporting features as described herein. For instance, the feature detection system 370 may maintain a travelway database 380 describing travelway data. The travelway database 380 may include geofence data 383 descriptive of geofences and/or affected travelway segments. Additionally and/or alternatively, the travelway database 380 may include segment data 384 describing segments of the travelway, such as how the travelway is segmented, coordinates and/or other positioning data associated with segments, and/or other suitable segment data. Additionally and/or alternatively, the travelway database 380 may include feature data 385 descriptive of known, previously reported, and/or expected features (e.g., manholes). Additionally and/or alternatively, the travelway database may include CAD data 386 describing roads, bridges, landmarks, and/or other travelways in a schematic format.

In addition to locally stored data, the feature detection system 370 may obtain data through communication with remote or third-party systems. For example, the feature detection system 370 may obtain map data 387 from a third-party map data provider and/or store map data 387 locally (e.g., in travelway database 380). Additionally and/or alternatively, the feature detection system 370 may obtain municipal data 388, such as by communicating with a municipal transportation customer system. Additionally and/or alternatively, the feature detection system 370 may obtain or otherwise store image data 389 including images depicting a travelway. The image data 389 may be or may include aerial images, satellite images, ground-based images, and/or any other suitable images. The feature detection system 370 may additionally record historical event data 394 descriptive of past reports and/or classifications of features. Additionally and/or alternatively, the feature detection system 370 may obtain meteorological data indicative of weather conditions, temperature, humidity, climate, and/or other meteorological characteristics of interest.

The feature detection system 370 may maintain a model repository 390 for training and/or deploying the machine-learned models 360 to the on-board system 350. The model repository 390 may include a machine-learned model store 393, which may store untrained, partially trained, and/or pre-trained machine-learned models. The models in the model store 393 may correspond to the machine-learned models 360 deployed to the on-board system 350. For instance, the models 360 may be identical to pre-trained models in the model store 393 and/or may be further refined through training processes performed on-board the vehicle 300. For instance, the models 360 may initially be deployed as copies of the models in the model store 393, but may be continually updated by reinforcement learning processes at the vehicle 300 itself. The vehicle may receive updated models 360 from the model store 393 as updates become available. The model repository 390 may also include a model trainer 391 and/or training data 392 for training (e.g., pre-training) the machine-learned models in the model store 393. An example training process is described with respect to method 900 of FIG. 9.

Figures 4A, 4B:
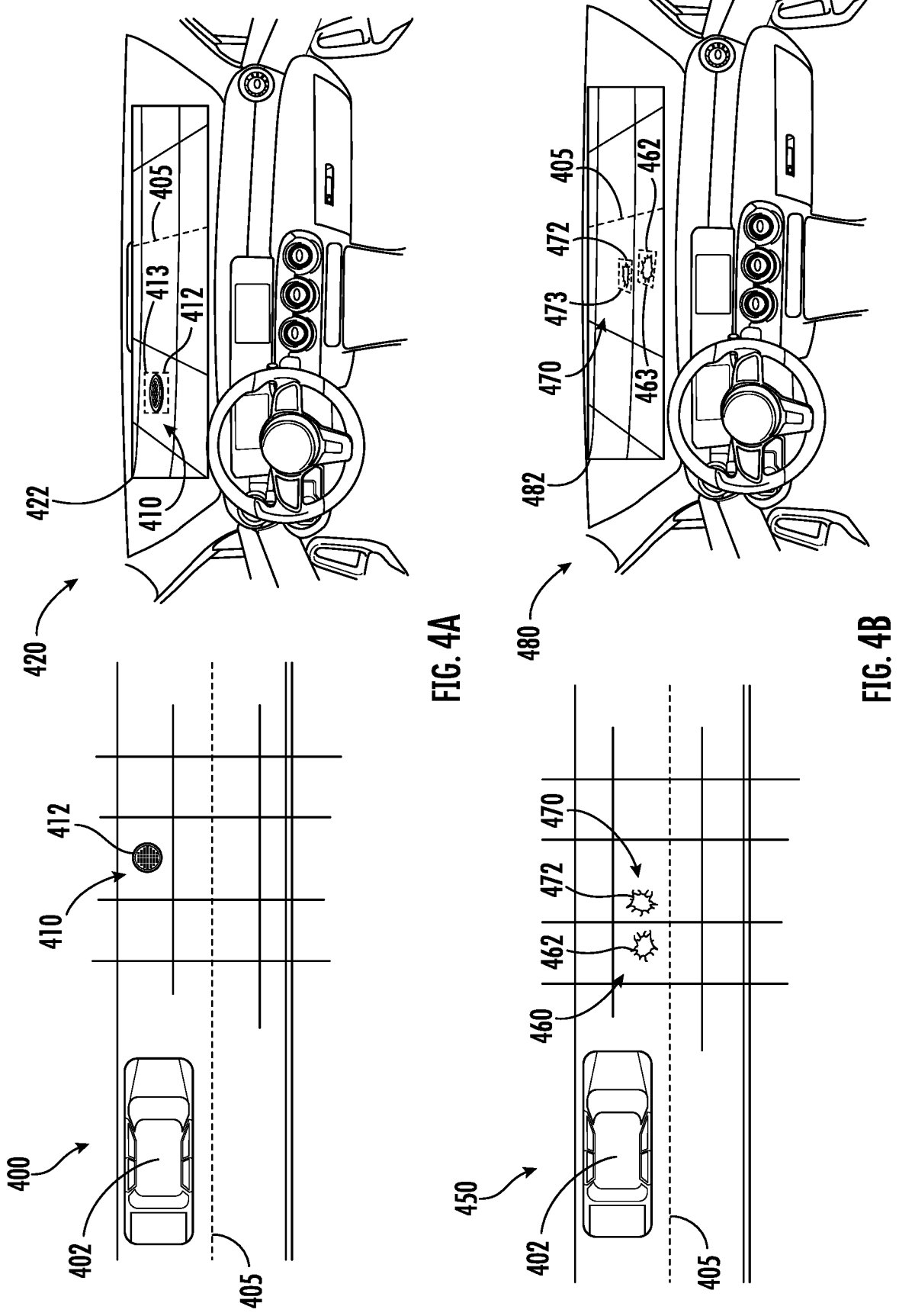
FIGS. 4A-4B illustrate a perspective view of feature tracking by a dash camera according to example embodiments hereof.

FIGS. 4A-4B illustrate a perspective view of feature tracking by a dash camera according to example embodiments hereof. In particular, FIG. 4A depicts an example travelway 400 being traversed by a vehicle 402. The travelway 400 includes a feature 412, in particular a manhole. The travelway 400 also includes a lane divider 405. As illustrated in FIG. 4A, the travelway 400 is divided into a plurality of segments, including segment 410 which encompasses the feature 412.

The cabin 420 illustrates the perspective of the vehicle 402 on travelway 400. The window 422 illustrates a view that may be available to a camera in vehicle 402, such as a dash cam. The camera may project or overlay segments (e.g., from map data or other travelway data) onto the image data captured by the camera. In addition, a machine-learned image processing model operating on image data from the camera may recognize the feature 412 in the image data.

As illustrated, the bounding box 413 represents a recognized position of the feature 412. An on-board system of vehicle 402 may thus recognize that feature 412 exists in segment 410 by comparing the bounding box 413 to coordinates associated with segment 410. The vehicle 402 may thus report that feature 412 exists in segment 410 to an appropriate authority, as described herein.

FIG. 4B depicts an example travelway 450 including a first feature 462, positioned in a first segment 460, and a second feature 472, positioned in a second segment 470. The cabin 480 illustrates the perspective of the vehicle 402 on travelway 450. The window 482 illustrates a view that may be available to a camera in vehicle 402, such as a dash cam. The camera may project or overlay segments (e.g., from map data or other travelway data) onto the image data captured by the camera. In addition, a machine-learned image processing model operating on image data from the camera may recognize the features 462 and 472 in the image data. As illustrated, the bounding box 463 represents a recognized position of the feature 462. An on-board system of vehicle 402 may thus recognize that feature 462 exists in segment 460 by comparing the bounding box 463 to coordinates associated with segment 460. Similarly, the bounding box 473 represents a recognized position of the feature 472. The vehicle may compare the coordinates of bounding box 473 to the coordinates of segments on travelway 450 to recognize that the feature 472 exists in segment 470. The vehicle 402 may thus report the features 462 and 472 an appropriate authority, as described herein.

Figure 5:
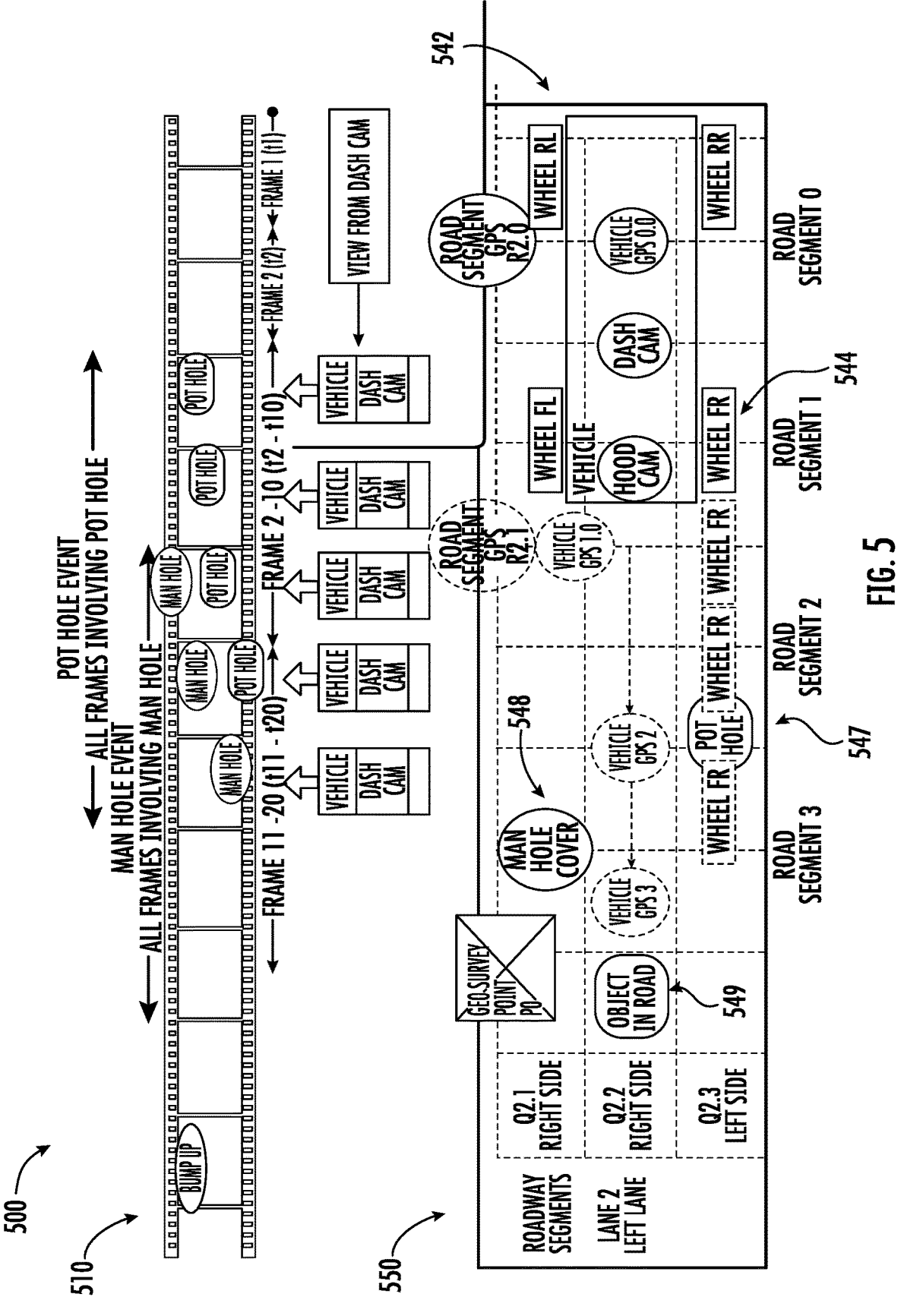
FIG. 5 illustrates a data flow diagram of feature detection according to example embodiments hereof.

FIG. 5 illustrates a data flow diagram 500 of feature detection according to example embodiments hereof. The flow diagram includes diagram 510 and diagram 550. Diagram 510 depicts a sequence of time frames with associated events, and diagram 550 depicts a block diagram of a segmented travelway. The vehicle 542 is depicted as driving from right to left along the segmented travelway. The travelway may include various features, including pothole 547, manhole cover 548, and object 549. As illustrated on diagram 510, a pothole detection event may begin at frame 2, wherein the dash cam of the vehicle 542 first detects the pothole 547. The pothole detection event may continue through frame t11, where the rear right wheel of the vehicle 542 interacts with the pothole 547 and the vehicle moves past the pothole 547. Similarly, a manhole detection event may begin at frame t8 where the dash cam observes the manhole cover 548 and continues through frame t14 when the rear left wheel of the vehicle interacts with the manhole cover 548. Eventually, the vehicle 542 may interacts with the object 549, leading to a bump event.

Example Methods for Feature Detection

FIG. 6 depicts a flow diagram that illustrates a method 600 for feature detection. In an embodiment, the method 600 may be performed by the control circuit 352 of the on-board system 350 and/or the control circuit(s) 372 of feature detection system 370 of FIG. 3. In another embodiment, the method 600 may be performed by the control circuit 1215 of the computing system 1205 of FIG. 10A. One or more portions of the method 600 may be implemented as an algorithm on the hardware components of the devices described herein. For example, the steps of method 600 may be implemented as operations/instructions that are executable by computing hardware.

Although FIG. 6 depicts steps performed in a particular order for purposes of illustration and discussion, the methods of the present disclosure are not limited to the particularly illustrated order or arrangement. The various steps of the method 600 may be omitted, rearranged, combined, and/or adapted in various ways without deviating from the scope of the present disclosure.

In an embodiment, the method 600 may begin with or otherwise includes a step 602, in which a computing system (e.g., the systems 350, 370, and/or 1205) receives, via one or more sensors of a vehicle (e.g., 200, 300, 402, 542), sensor data indicative of a feature within a travelway on which the vehicle (e.g., 200, 300, 402, 542) is traveling and motion data indicative of a movement of a component of the vehicle (e.g., 200, 300, 402, 542) associated with the feature. The feature indicated by the sensor data may be any suitable feature. In an embodiment, the feature indicated by the sensor data may be or may include a surface defect on a surface of the travelway. The surface defect may reflect a deviation of the surface from an original condition of the surface when constructed. Additionally and/or alternatively, the surface defect may be or may include a structure that disrupts a smooth plane created by the surface of the travelway. Example surface defects include, but are not limited to, potholes, manholes, cracks or fissures, sinkholes, steel plates, foreign objects or obstructions, and/or other suitable surface defects. In an embodiment, the feature indicated by the sensor data may be or may include a bridge failure, bridge defect, partial and/or complete bridge collapse, and/or other damage to a bridge or bridge surface. In an embodiment, the feature indicated by the sensor data may be or may include signage anomalies such as damaged signage, missing signage, vandalized signage, or other suitable signage anomalies. In an embodiment, the feature indicated by the sensor data may be or may include a landmark.

The one or more sensors from which sensor data may be received at step 602 may include any suitable sensors, such as cameras, LIDAR sensors, RADAR sensors, motion sensors (e.g., velocity sensors, acceleration sensors, etc.), control sensors (e.g., steering sensors, braking sensors, etc.), temperature sensors, shock sensors, vibration sensors, and/or any other suitable sensors, and/or combinations thereof. The travelway may be a road, bridge, path, track, and/or other suitable travelway on which the vehicle (e.g., 200, 300, 402, 542) may travel, and/or a portion thereof. A surface of the travelway may be formed of any suitable material, such as concrete, asphalt, brick, stone, gravel, dirt, metal, and/or any other suitable material, and/or combination thereof.

The sensor data received at step 602 may be or may include any suitable sensor data. In an embodiment, the sensor data may include image data captured via one or more cameras of the vehicle (e.g., 200, 300, 402, 542). As an example, the image data may include a first image obtained via a front camera (e.g., 202, 204, 306, 316). The front camera (e.g., 202, 204, 306, 316) may be positioned at a front location of the vehicle (e.g., 200, 300, 402, 542) and/or facing a forward direction relative to the vehicle (e.g., 200, 300, 402, 542). The front location of the vehicle (e.g., 200, 300, 402, 542) may be any location that is generally forward of a median of the vehicle (e.g., 200, 300, 402, 542), such as, for example, a dashboard, an engine hood, a front bumper, and/or any other suitable location. As examples, the front camera (e.g., 202, 204, 306, 316) may be a dash mounted camera, a hood camera, a front bumper camera, and/or any other suitable camera positioned at a front location of the vehicle (e.g., 200, 300, 402, 542) and/or facing a forward direction relative to the vehicle (e.g., 200, 300, 402, 542). Additionally and/or alternatively, the image data may include a second image obtained via a rear camera (e.g., 218, 318). The rear camera (e.g., 218, 318) may be positioned at a rear location of the vehicle (e.g., 200, 300, 402, 542) and/or facing a rear direction relative to the vehicle (e.g., 200, 300, 402, 542). The rear location of the vehicle (e.g., 200, 300, 402, 542) may be any location that is generally behind a median of the vehicle (e.g., 200, 300, 402, 542), such as, for example, a trunk, a rear windshield, a rear bumper, and/or any other suitable location. As examples, the rear camera (e.g., 218, 318) may be a rear-facing dash camera, rear-view mirror cameras, rear bumper camera, trunk-mounted camera, and/or any other suitable camera positioned at a rear location of the vehicle (e.g., 200, 300, 402, 542).

The motion data received at step 602 may be or may include any suitable motion data. The motion data may include, for example, velocity data, acceleration data, braking data, steering data, jerk or vibration data, impact data or force data, and/or any other suitable data. Additionally and/or alternatively, the component of the vehicle (e.g., 200, 300, 402, 542) may be any suitable component. Example components of the vehicle (e.g., 200, 300, 402, 542) include a wheel of the vehicle (e.g., 200, 300, 402, 542) (e.g., associated with motion data such as rotational speed, impact force, suspension tension, steering bearing, etc.), a chassis of the vehicle (e.g., 200, 300, 402, 542) (e.g., associated with motion data such as acceleration, velocity, movement relative to wheels, impact force, etc.), and/or other suitable components, and/or combinations thereof. In an embodiment, the motion data may be or may include acceleration data of the vehicle (e.g., 200, 300, 402, 542) captured via an acceleration sensor of the vehicle (e.g., 200, 300, 402, 542).

In an embodiment, the component associated with the motion data received at step 602 may be a wheel in contact with the surface of the travelway and/or the motion data may be or may include data indicative of a force on the wheel as the wheel interacts with the feature on the surface. For instance, the wheel may experience a force as it passes over a bump, crack, pothole, manhole, or other feature on the travelway. The force experienced by the wheel may indicate characteristics of the feature such as depth, width, severity, type, and/or other characteristics.

In an embodiment, the motion data received at step 602 may be or may include vibration data indicative of a vibration of the component of the vehicle (e.g., 200, 300, 402, 542). In an embodiment, the vibration data may include a first vibration value obtained via a first shock sensor associated with a first wheel of the vehicle (e.g., 200, 300, 402, 542) and a second vibration value obtained via a second shock sensor associated with a second wheel of the vehicle (e.g., 200, 300, 402, 542). For instance, the relative vibrations experienced by different wheels of the vehicle (e.g., 200, 300, 402, 542) may indicate characteristics of the feature.

Referring still to FIG. 6, the method 600 may, in an embodiment, include a step 604, in which the computing system (e.g., the systems 350, 370, and/or 2002) receives, via a positioning system of the vehicle (e.g., 200, 300, 402, 542), positioning data of the vehicle (e.g., 200, 300, 402, 542), the positioning data being associated with a position of the vehicle (e.g., 200, 300, 402, 542) within a first segment of the travelway. The positioning system may be any suitable positioning system and/or combinations thereof. As one example, the positioning system may be or may include a satellite positioning system, such as GPS or GLONASS. As another example, the positioning system may segment a travelway into a plurality of travelway segments. The positioning data may include which travelway segment(s) the vehicle (e.g., 200, 300, 402, 542) is located or positioned within. For instance, the positioning system may compare coordinates (e.g., satellite coordinates) of the vehicle (e.g., 200, 300, 402, 542) to coordinates associated with travelway segments to identify which segments the vehicle (e.g., 200, 300, 402, 542) is positioned within. Additionally and/or alternatively, the positioning system may utilize computer vision techniques, such as lane recognition techniques, to identify which lane and/or segment of a travelway the vehicle (e.g., 200, 300, 402, 542) is positioned within.

The method 600 of FIG. 6 may, in an embodiment, include a step 606, in which the computing system (e.g., the systems 350, 370, and/or 2002) obtains travelway data for the first segment based on the positioning data. The travelway data may include any suitable data descriptive of characteristics of the first segment. The travelway data may include map data. For instance, the map data may define a two-dimensional and/or three-dimensional representation of the first segment. The travelway data may include municipal data. The municipal data may include municipal records of the first segment, such as known features, schematics or CAD drawings, satellite images, aerial images, survey images, utility information, contractor information, and/or other suitable data. The travelway data may include geofence data indicative of one or more geofences applicable to the road segment. The travelway data may include other image data corresponding to the first segment, such as third-party aerial and/or satellite images.

The method 600 of FIG. 6 may, in an embodiment, include a step 608, in which the computing system (e.g., the systems 350, 370, and/or 2002), based on the sensor data and the motion data received at step 602, the positioning data received at step 604, and/or the travelway data received at step 606, generates, using one or more machine-learned models (e.g., 360), an output that is indicative of a classification of the feature within the travelway and a location of the feature within the first segment of the travelway. The one or more machine-learned models (e.g., 360) may be or may include any suitable machine-learned models, such as neural networks, convolutional neural networks, RCNN object detection models, computer vision models, hybrid models, and/or any other suitable models, and/or combinations thereof. Example machine-learned models are discussed in greater detail with respect to FIGS. 8A through 8C.

In an embodiment, the one or more machine-learned models (e.g., 360) may be or may include a machine-learned image processing model (e.g., machine-learned image processing model 802 of FIG. 8A). The image processing model (e.g., 802) may be or may include a mask region-based convolutional neural network (R-CNN) that is trained to process the image data to determine at least one of: (i) a location of the feature, (ii) a type of the feature, (iii) a width parameter of the feature, or (iv) a depth parameter of the feature. In an embodiment, a unique image processing model (e.g., 802) may be associated with a given camera on the vehicle (e.g., 200, 300, 402, 542). For instance, a first image processing model (e.g., 802) may be associated with a first camera on the vehicle (e.g., 200, 300, 402, 542) whereas a second image processing model (e.g., 802) may be associated with a second camera on the vehicle (e.g., 200, 300, 402, 542). The model associated with the camera may be trained based on training data from that camera or from a similarly positioned camera on other vehicles. Additionally, the model may operate primarily or exclusively on image data from the associated camera.

In an embodiment, the one or more machine-learned models (e.g., 360) may be or may include a machine-learned vibration processing model (e.g., machine-learned vibration processing model 822 of FIG. 8B). The machine-learned vibration processing model (e.g., 822) may be a convolutional neural network (CNN) that is trained to process the vibration data to determine an impact force of the vehicle (e.g., 200, 300, 402, 542) physically contacting the feature. The machine-learned vibration processing model may be trained to use the impact force to determine at least one of:

(i) a location of the feature, (ii) a type of the feature, (iii) a width parameter of the feature, or (iv) a depth parameter of the feature.

In an embodiment, the one or more machine-learned models (e.g., 360) may be or may include a machine-learned hybrid model (e.g., machine-learned hybrid model 842 of FIG. 8C) that is trained to generate the classification of the feature based on an event defined by the sensor data and the motion data. For instance, the hybrid model may be used to generate a probability of a specific object detection and impact. An initiation of the event may be based on a time at which the feature is identified by a machine-learned image processing model (e.g., 802) based on the sensor data. Additionally and/or alternatively, a termination of the event may be based on a time at which the feature is identified by a machine-learned vibration processing model based on the motion data.

The hybrid model may be event-based, wherein a model (e.g., the hybrid model, an image processing model (e.g., 802)) may first recognize the feature at some distance in front of the vehicle (e.g., 200, 300, 402, 542) and initiate an event associated with that feature. For instance, the model may detect the feature in camera data from front cameras on the vehicle (e.g., 200, 300, 402, 542), such as a dash camera (e.g., 202, 306), hood cameras (e.g., 204, 316), front bumper cameras, and/or other front cameras. At an initial time (e.g., at time t0), the model may output an initial detection. That feature may then be tracked using the hybrid model. As the vehicle (e.g., 200, 300, 402, 542) approaches the feature, the hybrid model may track movement of the feature at subsequent times (e.g., t1, t2, and so on). Supposing that, at time t1, the feature is now visible from a second front camera (e.g., a hood camera), the model associated with the first front camera may continue to track the feature and, in addition, the model associated with the second front camera may track the feature. Suppose at time t3, the feature impacts a front tire of the vehicle (e.g., 200, 300, 402, 542) and, at time t4, the feature impacts a rear tire of the vehicle (e.g., 200, 300, 402, 542) (e.g., on a same side of the vehicle). Finally, at a time t5, the feature is visible to a rear camera (e.g., 218, 318) of the vehicle and/or may be tracked by a model associated with that rear camera (e.g., 218, 318). Coincident and/or subsequent to the impact with the rear tire and/or detection on the rear camera (e.g., 218, 318), the vehicle may end the event associated with the feature. The outputs from the models during these events may be provided as feature inputs to the hybrid model. The hybrid model may generate more refined classification data, such as a general model file, hyperparameters, weight data, impact data, physical data, and/or other data descriptive of the feature. In an embodiment, the hybrid model may be a neural network model with a temporal component.

Referring still to FIG. 6, the method 600 may, in an embodiment, include a step 610, in which the computing system (e.g., the systems 350, 370, and/or 2002) transmits, to a server that is remote from the vehicle (e.g., 200, 300, 402, 542), the output indicative of the classification of the feature and the location of the feature within the first segment. The server that is remote from the vehicle (e.g., 200, 300, 402, 542) may be or may include a server owned, maintained, or otherwise operated by a municipality or other authority responsible for maintaining the first segment and/or the travelway. The server may be, for example, a municipal transportation customer system, such as the municipal transportation customer system 110 of FIG. 1. In an embodiment, the server to which the computing system transmits the output may be configured to perform at least one of the following: (i) transmit data indicative of the feature to a system for repair of the feature; (ii) transmit data indicative of a notification of the feature to a second vehicle; (iii) transmit data indicative of a route to avoid the feature; or (iv) verify that the feature has been addressed. For instance, the authority may be responsible for repairing, monitoring, or otherwise responding to the feature and the server may perform one or more actions to facilitate the responsibilities of the authority.

In an embodiment, the server to which the computing system transmits the output at step 610 is configured to receive, from a second vehicle, a second classification of the feature located in the first segment. The travelway data for the first segment may be updated based on an aggregation of the classification and the second classification. For instance, reports from the vehicle (e.g., 200, 300, 402, 542) may be corroborated (e.g., validated, verified) with that of other vehicles on the travelway to facilitate a reliable and frequently updated record of features. As one example, if the classification and the second classification match, the server may associate a higher confidence with the classification. As another example, if the classification and the second classification differ, the server may refrain from action until the classification is confirmed by additional vehicles. In an embodiment, the server may only take action in response to the classification after receiving a plurality of corroborating classifications from a plurality of vehicles. In an embodiment, the vehicle (e.g., 200, 300, 402, 542) (e.g., a control circuit of the vehicle (e.g., 200, 300, 402, 542)) may receive updated travelway data indicative of the classification of the feature and the location of the feature. For instance, the vehicle (e.g., 200, 300, 402, 542) may receive the updated travelway data in response to the aggregation of the classification and the second classification.

In an embodiment, in addition to transmitting the classification in step 610, the vehicle (e.g., 200, 300, 402, 542) may report additional characteristics or information regarding the feature. For instance, the vehicle (e.g., 200, 300, 402, 542) may report a severity of the feature, such as a depth of the feature (e.g., depth of the pothole). As another example, the vehicle (e.g., 200, 300, 402, 542) may report a likelihood that the feature will cause damage to and/or is otherwise hazardous to a vehicle (e.g., 200, 300, 402, 542) traveling along the travelway, such as tire damage, suspension damage, personal injury, or other negative effects.

FIG. 7 illustrates a flowchart diagram of a method 700 for feature detection according to example embodiments hereof. In an embodiment, the method 700 may be performed by the control circuit 352 of the on-board system 350 and/or the control circuit(s) 372 of feature detection system 370 of FIG. 3. In another embodiment, the method 700 may be performed by the control circuit 1215 of the computing system 2002 of FIG. 10A. Although FIG. 7 depicts steps performed in a particular order for purposes of illustration and discussion, the methods of the present disclosure are not limited to the particularly illustrated order or arrangement. The various steps of the method 700 may be omitted, rearranged, combined, and/or adapted in various ways without deviating from the scope of the present disclosure. One or more portions of the method 700 may be implemented as an algorithm on the hardware components of the devices described herein. For example, the steps of method 600 may be implemented as operations/instructions that are executable by computing hardware.

In an embodiment, the method 700 may begin with or otherwise include a step 702, in which a computing system (e.g., the systems 350, 370, and/or 2002) creates and packages machine-learned models into a machine-learned model store. The machine-learned models may be any suitable models, such as models able to identify road surface material and road conditions in addition to identifying specific features (e.g., road hazards and landmarks). The machine-learned models may be initially deployed to vehicles with pre-trained data and configuration parameters such as hyper-parameters for several types of models.

In an embodiment, the machine-learned models may include an image processing model (e.g., 802), such as a Mask-RCNN computer vision model, that identifies objects in image data and/or video data. This model may be trained to identify features including road landmarks, such as manholes, bridges, mile-markers, etc. Additionally and/or alternatively, this model may be trained to identify features including road hazards, such as potholes, rocks, uneven roads, bridge segments. An example training process is described by method 900 of FIG. 9.

In an embodiment, the machine-learned models include a vibration processing model (e.g., 822), such as a convolutional neural network, that use vibration data describing forces detected by the impact of the wheel of the vehicle (e.g., 200, 300, 402, 542) going over an object. The input data to this model may be based on a fusion of sensors used to adjust the vehicle suspension in each wheel and/or vehicle chassis. The vibration processing model may use this fused information to determine what kind of object the wheel went over. In an embodiment, material on the wheel may be used to detect regions of contact with the tire rubber and the road or object.

In an embodiment, the machine-learned models may be or may include a machine-learned hybrid model that is trained to generate the classification of the feature based on an event defined by the sensor data and the motion data. For instance, the hybrid model may be used to generate a probability of a specific object detection and impact. An initiation of the event may be based on a time at which the feature is identified by a machine-learned image processing model (e.g., 802) based on the sensor data. Additionally and/or alternatively, a termination of the event may be based on a time at which the feature is identified by a machine-learned vibration processing model based on the motion data. In an embodiment, a beginning of the event starts when a particular feature is within a certain range of the vehicle (e.g., 200, 300, 402, 542). The event may end after the vehicle (e.g., 200, 300, 402, 542) makes contact with the feature. Video data and/or image data from the cameras on the vehicle (e.g., 200, 300, 402, 542) that witness the event may be stored in memory (e.g., temporarily) after being processed by the image processing model (e.g., 802). Vehicle (e.g., 200, 300, 402, 542) wheel force data from the start of the event to the end of the event may also be stored in memory (e.g., temporarily) after processing from the vibration processing model. For instance, the sensor data and/or motion data may be stored in a non-transitory computer-readable medium onboard and/or offboard the vehicle (e.g., 200, 300, 402, 542). The hybrid model may use the event data in a hybrid Mask-RCNN/CNN model to evaluate both image sequences as well as wheel force data to determine what object was encountered during the event. Multiple events may overlap in time, so a first event and/or a second event corresponding to unique features may share some timeline.

Referring still to FIG. 7, the method 700 may, in an embodiment, include a step 704, in which the computing system (e.g., the systems 350, 370, and/or 2002) stores pre-trained models in the machine-learned model store. The models may be trained once in the model store to produce the pre-trained models.

The method 700 of FIG. 7 may, in an embodiment, include a step 706, in which a vehicle (e.g., the vehicles 200, 300, 402, 542) downloads the models and pre-trained training data. The models, along with relevant training data, may be pushed to vehicles using some specific criteria such as a geo-fence, region of land, type of car or other criteria that if the vehicle (e.g., 200, 300, 402, 542) matches the model is downloaded to the vehicle (e.g., 200, 300, 402, 542) and stored. The vehicle (e.g., 200, 300, 402, 542) may receive a list of updated models and downloads updates as needed. Geo-fencing data and other configuration data may also be sent and received on the vehicle (e.g., 200, 300, 402, 542).

The method 700 of FIG. 7 may, in an embodiment, include a step 708, in which the vehicle (e.g., the vehicles 200, 300, 402, 542) captures and routes vibration data such as wheel and/or chassis force data. This data may represent the systems that monitor and control vehicle suspension and/or data related to the wheels. The vehicle (e.g., 200, 300, 402, 542) may collect rotational velocity of the wheel, turning angle, and/or forces on the wheel as it travels over the travelway. This wheel data may be sent to the input of the vibration processing model, which uses the forces acting on the wheel over time (e.g., in addition to other features) to determine when a feature is encountered by the wheel along the travelway. Vehicle data such as heading, GPS, speed and acceleration, chassis forces, wheel forces and/or other data may also be collected.

The method 700 of FIG. 7 may, in an embodiment, include a step 710, in which the vehicle (e.g., the vehicles 200, 300, 402, 542) captures and routes camera data, such as image data and/or video data. The vehicle (e.g., 200, 300, 402, 542) may capture images and/or video sequences from cameras such as hood cameras, dash cameras, and/or any other available cameras that may witness a feature. In an embodiment, the vehicle (e.g., 200, 300, 402, 542) may also capture audio data, such as an audio recording of the impact of the wheel on a feature. For instance, some objects may be identified based on the sound they make when impacted. When contacted by a vehicle tire, a feature may make distinct sounds based on the size, shape, material, etc. of the feature. For instance, while a pothole and a manhole may have similar sizes in some cases, a pothole will create a sound more consistent with rubber impacting asphalt while a manhole will create a sound more consistent with rubber impacting metal when impacted by a rubber tire of a vehicle (e.g., 200, 300, 402, 542). This data may be provided to the image processing model (e.g., 802) in addition to the image data to facilitate classification of the feature.

The method 700 of FIG. 7 may, in an embodiment, include a step 712, in which the computing system (e.g., the systems 350, 370, and/or 2002) inputs vibration data and/or camera data to a vibration processing model. If necessary, inference and training are performed using the vibration data. The vibration processing model may predict a classification of the feature. For example, going over a manhole generates a relatively consistent and unique profile when viewing physical forces on a wheel during the time of the object and wheel interaction/impact. The objective of this model may be to provide a general classification of the feature with some associated confidence (e.g., pothole (70%), manhole (30%)) even if the evaluation is not certain. The physical forces may also be used to calculate a magnitude factor of the impact. The vibration processing model may provide a classification of a short event sequence (e.g., over a number of milliseconds or seconds). The event classification may be, for example, impact pothole, impact manhole, impact small rock, impact medium rock, impact large rock or obstacle. The calculated physical forces may be used to determine a general magnitude of the forces on the wheel. A magnitude on a particular wheel may also be generated. The magnitude may be expressed on as a value, relative value, level, etc. For example, a magnitude of "100" (out of 100) may indicate an impact that exceeds the structure of the wheel. In an example, hitting a curb head on at a high velocity might result in magnitude "100" where the wheel is destroyed or severely damaged. The magnitudes may be linear from a small bump to a large pothole. In an embodiment, the magnitude may also be translated into a factor scale.

The method 700 of FIG. 7 may, in an embodiment, include a step 714, in which the computing system (e.g., the systems 350, 370, and/or 2002) inputs vibration data and/or camera data to an image processing model (e.g., 802). The image processing model (e.g., 802) (e.g., the Mask-RCNN model) may be trained for roadway and bridgeway objects such that the model is able to identify a feature, such as a pothole, manhole or other hazard or landmark. The model may also output a predicted position (e.g., a bounding box) where a feature is identified. which may assist in classification. The model may output a mask of the detected feature. With an understanding of the optics of the camera, the position of the camera within the vehicle (e.g., 200, 300, 402, 542), the position of the GPS sensor and velocity of the vehicle (e.g., 200, 300, 402, 542), the system may predict where on the road the feature is located. The model may further identify an appearance of the feature based on the image data depicting the object.

The method 700 of FIG. 7 may, in an embodiment, include a step 716, in which the computing system (e.g., the systems 350, 370, and/or 2002) synchronizes video frames to impact data to generate an event package. Using the location of the feature detected in the image processing model (e.g., 802) and using the mask coordinates, the model may generate a list of events over time stamps describing a center of the feature and mask of the region attributed to the feature. The outputs of the vibration processing model may also have time stamps similar to the images. The impact event and the estimated impact times of the object detection may be aligned with the impact events to produce an event package. The event package may then be sent to the hybrid model for further processing.

The method 700 of FIG. 7 may, in an embodiment, include a step 718, in which the computing system (e.g., the systems 350, 370, and/or 2002) provides the outputs of the vibration processing model and the image processing model (e.g., 802) as inputs to a hybrid model. The hybrid model may combine related features from the output of the earlier models and run inference on a sequence of sub-events that make up the event. In an example, the event may start at some point in time when the vehicle (e.g., 200, 300, 402, 542) is close enough to a feature. After interacting with the feature, the event may end. The sub-events may be provided to the hybrid model, which may output a final event package including a predicted occurrence of the event and/or information about the feature.

The method 700 of FIG. 7 may, in an embodiment, include a step 720, in which the computing system (e.g., the systems 350, 370, and/or 2002) packages and stores the model outputs in a feature detection system. The final event package may be compressed, encrypted and/or sent to the feature detection system for storage and/or cataloging. Additional vehicle data may be sent directly to backend cloud services. The cloud services may receive the packages of events that the vehicles have encountered during trips. Similar events may be organized by geographical location and/or plotted events on a global timeline. High confidence features may be marked geographically with a positioning system (e.g., GPS) such that a municipality may track these high confidence features. A machine learning engineer may evaluate the accuracy of the results of the models collected from events over multiple vehicles to determine whether the models should be retrained with updated data or modified to provide more accurate results. The results of the road hazard objects may be managed in the feature detection system. The feature detection system may be integrated with a navigation database to provide immediate information on the road hazard to other vehicles on the navigation system. When a road hazard is no longer detected, the road hazard may then be archived and removed from the active road hazards lists.

Example Machine-Learned Models

FIGS. 8A through 8C illustrate block diagrams of example machine-learned models according to example embodiments hereof. In particular, FIG. 8A illustrates an example imaging processing system 800 including a machine-learned image processing model 802. The image processing model 802 may be associated with one or more systems described herein. One or more of the systems may be implemented as modules, portions, layers, sub-models, etc. of the image processing model (e.g., 802), or as separate accessible systems from the image processing model 802.

The image processing model 802 may be or may include a mask region-based convolutional neural network (R-CNN) that is trained to process image data to determine at least one of: (i) a location of the feature, (ii) a type of the feature, (iii) a width parameter of the feature, or (iv) a depth parameter of the feature. The image processing model 802 may be or may include a mask RCNN computer vision model that is trained to identify objects in image data and/or video data. The image processing model 802 may be trained to identify features including road landmarks, such as manholes, potholes, bridges, mile markers, potholes, rocks, uneven roads, and/or other features.

The image processing system 800 may receive, as input, various sensor data and/or other data associated with a travelway. As an example, the image processing system 800 may receive image data 801. The image data 801 may include one or more images, such as static images and/or frames of video data, depicting a travelway. The image data 801 may be or may include aerial images, satellite images, ground-based images, and/or any other suitable images. The image data 801 may include images in any suitable format, such as bitmap, JPEG, PNG, and/or other suitable formats.

In an embodiment, the image processing model 802 may be associated with a given camera on a vehicle (e.g., 200, 300, 402, 542). As an example, if the image processing model 802 is associated with a front camera (e.g., 202, 204, 306, 316), the image data 801 may include at least a first image obtained via the front camera (e.g., 202, 204, 306, 316). The front camera (e.g., 202, 204, 306, 316) may be positioned at a front location of the vehicle (e.g., 200, 300, 402, 542) and/or facing a forward direction relative to the vehicle (e.g., 200, 300, 402, 542). The front location of the vehicle (e.g., 200, 300, 402, 542) may be any location that is generally forward of a median of the vehicle (e.g., 200, 300, 402, 542), such as, for example, a dashboard, an engine hood, a front bumper, and/or any other suitable location. As examples, the front camera may be a dash mounted camera, a hood camera, a front bumper camera, and/or any other suitable camera positioned at a front location of the vehicle (e.g., 200, 300, 402, 542) and/or facing a forward direction relative to the vehicle (e.g., 200, 300, 402, 542). Additionally and/or alternatively, if the image processing model (e.g., 802) is associated with a rear camera (e.g., 218, 318), the image data 801 may include a second image obtained via the rear camera (e.g., 218, 318). The rear camera (e.g., 218, 318) may be positioned at a rear location of the vehicle (e.g., 200, 300, 402, 542) and/or facing a rear direction relative to the vehicle (e.g., 200, 300, 402, 542). The rear location of the vehicle (e.g., 200, 300, 402, 542) may be any location that is generally behind a median of the vehicle (e.g., 200, 300, 402, 542), such as, for example, a trunk, a rear windshield, a rear bumper, and/or any other suitable location. As examples, the rear camera (e.g., 218, 318) may be a rear-facing dash camera, rear-view mirror cameras, rear bumper camera, trunk-mounted camera, and/or any other suitable camera positioned at a rear location of the vehicle (e.g., 200, 300, 402, 542).

In an embodiment, the image processing system may receive, as input, positioning data 803. The positioning data 803 may be associated with a position of a vehicle (e.g., 200, 300, 402, 542) within a segment of a travelway. The positioning data 803 may be obtained from a positioning system. The positioning system may be any suitable positioning system and/or combinations thereof. As one example, the positioning system may be or may include a satellite positioning system, such as GPS or GLONASS. As another example, the positioning system may segment a travelway into a plurality of travelway segments. The positioning data 803 may include which travelway segment(s) the vehicle (e.g., 200, 300, 402, 542) is located or positioned within. For instance, the positioning system may compare coordinates (e.g., satellite coordinates) of the vehicle (e.g., 200, 300, 402, 542) to coordinates associated with travelway segments to identify which segments the vehicle (e.g., 200, 300, 402, 542) is positioned within. Additionally and/or alternatively, the positioning system may utilize computer vision techniques, such as lane recognition techniques, to identify which lane and/or segment of a travelway the vehicle (e.g., 200, 300, 402, 542) is positioned within. In an embodiment, the position system may utilize localization techniques to identify which lane and/or segment of a travelway the vehicle (e.g., 200, 300, 402, 542) is positioned within. The image processing system 800 may utilize the positioning data 803 to determine where a feature is located in coordinate space.

In an embodiment, the image processing system 800 may receive, as input, travelway data 805. The travelway data 805 may include any suitable data that describes one or more characteristics of the travelway. As an example, the travelway data 805 may include geofence data descriptive of geofences and/or affected travelway segments. Additionally and/or alternatively, the travelway data 805 may include segment data describing segments of the travelway, such as how the travelway is segmented, coordinates and/or other positioning data associated with segments, and/or other suitable segment data. Additionally and/or alternatively, the travelway data 805 may include feature data descriptive of known, previously reported, and/or expected features (e.g., manholes). Additionally and/or alternatively, the travelway database may include CAD data describing roads, bridges, landmarks, and/or other travelways in a schematic format.

Using the input data, such as the image data 801, the positioning data 803, and/or the travelway data 805, the image processing system 800 may predict, as outputs 812, various information about the feature based on information available in the input data. For instance, the image processing system 800 may include a feature location determination system 804. The feature location determination system 804 may be configured to determine a location of the feature, such as GPS coordinates of the feature and/or a relative location of the feature in image data, based on the input data and/or outputs from the machine-learned image processing model 802. Additionally and/or alternatively, the image processing system 800 may include a feature type determination system 806. The feature type determination system 806 may be configured to determine a type of the feature (e.g., a classification of the feature) based on the input data and/or outputs from the machine-learned image processing model 802. Additionally and/or alternatively, the image processing system 800 may include a feature width determination system 808. The feature width determination system 808 may be configured to determine a width of the feature (e.g., a classification of the feature) based on the input data and/or outputs from the machine-learned image processing model 802. Additionally and/or alternatively, the image processing system 800 may include a feature depth determination system 810. The feature depth determination system 810 may be configured to determine a depth of the feature (e.g., a classification of the feature) based on the input data and/or outputs from the machine-learned image processing model 802. The characteristics of the feature predicted by the image processing system 800, such as feature location, feature type, feature width, and/or feature depth, may be output (e.g., as outputs 812).

FIG. 8B illustrates an example vibration processing system 820 including a machine-learned vibration processing model 822. The machine-learned vibration processing model 822 may be associated with one or more systems described herein. One or more of the systems may be implemented as modules, portions, layers, sub-models, etc. of the machine-learned vibration processing model 822, or as separate accessible systems from the machine-learned vibration processing model 822.

The machine-learned vibration processing model 822 may be a convolutional neural network (CNN) that is trained to process the vibration data to determine an impact force of the vehicle (e.g., 200, 300, 402, 542) physically contacting the feature. The machine-learned vibration processing model 822 may be trained to use the impact force to determine at least one of: (i) a location of the feature, (ii) a type of the feature, (iii) a width parameter of the feature, or (iv) a depth parameter of the feature. As an example, a vibration processing model 822 may be or may include a convolutional neural network that utilizes forces detected by an impact of a tire passing over an object to determine a type of object that the tire passed over. In an embodiment, material on the wheel may be used to detect regions of contact with tire rubber and the travelway and/or feature.

The vibration processing system 820 may receive, as input, sensor data 821. The sensor data 821 may be or may include any suitable sensor data. In an embodiment, the sensor data 821 may include image data captured via one or more cameras of the vehicle (e.g., 200, 300, 402, 542). Additionally and/or alternatively, the sensor data 821 may include LIDAR data, RADAR data, audio data, temperature data, and/or any other suitable sensor data.

Additionally and/or alternatively, the vibration processing system 820 may receive, as input, motion data 823. The motion data 823 may include, for example, velocity data, acceleration data, braking data, steering data, jerk or vibration data, impact data or force data, and/or any other suitable data. In an embodiment, the motion data 823 may be or may include acceleration data of the vehicle (e.g., 200, 300, 402, 542) captured via an acceleration sensor of the vehicle (e.g., 200, 300, 402, 542).

In an embodiment, the vibration processing model 822 may be associated with a given component on a vehicle (e.g., 200, 300, 402, 542). The component of the vehicle (e.g., 200, 300, 402, 542) may be any suitable component. Example components of the vehicle (e.g., 200, 300, 402, 542) include a wheel of the vehicle (e.g., 200, 300, 402, 542) (e.g., associated with motion data such as rotational speed, impact force, suspension tension, steering bearing, etc.), a chassis of the vehicle (e.g., 200, 300, 402, 542) (e.g., associated with motion data such as acceleration, velocity, movement relative to wheels, impact force, etc.), and/or other suitable components, and/or combinations thereof. As an example, if the vibration processing model 822 is associated with a front wheel, the motion data 823 may include at least vibration data associated with the front wheel. Additionally and/or alternatively, if the vibration processing model is associated with a chassis, the motion data 823 may include at least vibration data associated with the chassis.

In an embodiment, the component associated with the motion data 823 may be a wheel in contact with the surface of the travelway and/or the motion data 823 may be or may include data indicative of a force on the wheel as the wheel interacts with the feature on the surface. For instance, the wheel may experience a force as it passes over a bump, crack, pothole, manhole, or other feature on the travelway. The force experienced by the wheel may indicate characteristics of the feature such as depth, width, severity, type, and/or other characteristics.

In an embodiment, the motion data 823 may be or may include vibration data indicative of a vibration of the component of the vehicle (e.g., 200, 300, 402, 542). In an embodiment, the vibration data may include a first vibration value obtained via a first shock sensor associated with a first wheel of the vehicle (e.g., 200, 300, 402, 542) and a second vibration value obtained via a second shock sensor associated with a second wheel of the vehicle (e.g., 200, 300, 402, 542). For instance, the relative vibrations experienced by different wheels of the vehicle (e.g., 200, 300, 402, 542) may indicate characteristics of the feature.

Using the input data, such as the sensor data 821 and/or the motion data 823, the vibration processing system 820 may predict, as outputs 834, various information about the feature based on information available in the input data. For instance, the vibration processing system 820 may include a feature location determination system 824. The feature location determination system 824 may be configured to determine a location of the feature, such as GPS coordinates of the feature and/or a relative location of the feature in vibration data, based on the input data and/or outputs from the machine-learned vibration processing model 822. Additionally and/or alternatively, the vibration processing system 820 may include a feature type determination system 826. The feature type determination system 826 may be configured to determine a type of the feature (e.g., a classification of the feature) based on the input data and/or outputs from the machine-learned vibration processing model 822. Additionally and/or alternatively, the vibration processing system 820 may include a feature width determination system 828. The feature width determination system 828 may be configured to determine a width of the feature (e.g., a classification of the feature) based on the input data and/or outputs from the machine-learned vibration processing model 822.

Additionally and/or alternatively, the vibration processing system 820 may include a feature depth determination system 830. The feature depth determination system 830 may be configured to determine a depth of the feature (e.g., a classification of the feature) based on the input data and/or outputs from the machine-learned vibration processing model 822. The characteristics of the feature predicted by the vibration processing system 820, such as feature location, feature type, feature width, and/or feature depth, may be output as outputs 834.

FIG. 8C illustrates an example event processing system 840 according to example embodiments hereof. The event processing system 840 can include a machine-learned hybrid model 842 that is trained to generate a classification of a feature based on an event defining interaction between a vehicle (e.g., 200, 300, 402, 542) and the feature. The hybrid model 842 may use outputs of machine-learned models and/or an event package 841 including synchronized sensor and/or motion data from an event in a hybrid Mask-RCNN/CNN model to determine what object was encountered during the event. Multiple events may overlap in time, so a first event and/or a second event corresponding to unique features may share some timeline. In an embodiment, the hybrid model 842 is a neural network model with a temporal component.

The event processing system 840 can receive the output 812 of the image processing system 800 and/or the output 834 of the vibration processing system 820. Additionally and/or alternatively, the event processing system 840 can receive an event package 841 including synchronized sensor data and motion data (e.g., sensor data 821 and/or motion data 823). Using the location of the feature detected by the image processing system 800 and using the mask coordinates, the hybrid model 842 may generate a list of events over time stamps describing a center of the feature and mask of the region attributed to the feature. The outputs of the vibration processing system 820 and/or image processing system 800 (e.g., outputs 812, 834) may have timestamps that can be synchronized. The impact event and the estimated impact times of the object detection may be aligned with the impact events to produce the event package 841.

The event processing system 840 may be used to generate a probability of a specific object detection and impact to recognize an event. In particular, the event processing system 840 may include an event occurrence determination system 846 that is configured to determine an occurrence of an event, such as an initiation and/or a termination of an event. An initiation of the event may be based on a time at which the feature is identified by a machine-learned image processing model (e.g., 802) based on the sensor data. Additionally and/or alternatively, a termination of the event may be based on a time at which the feature is identified by a machine-learned vibration processing model based on the motion data. In an embodiment, a beginning of the event starts when a particular feature is within a certain range of the vehicle (e.g., 200, 300, 402, 542). The event may end after the vehicle (e.g., 200, 300, 402, 542) makes contact with the feature.

The event processing system 840 may include a feature classification determination system 844. The feature classification determination system 844 may determine a classification of a feature based on the outputs 812 and 834, the event package 841, and/or the processing performed by the machine-learned hybrid model 842. The classification may be provided as model output 850. The hybrid model 842 and/or the feature classification determination system 844 may generate more refined classification data than the image processing system 800 and/or the vibration processing system 820 could individually. The classification may include any suitable manner of classification for a feature, such as a general type, width, depth, location as a general model file, hyperparameters, weight data, impact data, physical data, and/or other data descriptive of the feature. As an example, a feature may be classified as a type of hazard (e.g., a pothole, manhole, fissure etc.). As another example, a feature may be classified by relative likelihood to cause damage to a vehicle (e.g., 200, 300, 402, 542) interacting with the feature. In addition to the classification, the feature classification determination system 844 may determine and/or the output 850 may include a relative confidence associated with the classification.

Example Method for Training Machine-Learned Models

FIG. 9 illustrates a flowchart diagram of a method 900 for training machine-learned models according to example embodiments hereof the present disclosure. In an embodiment, the method 900 may be performed by the control circuit 352 of the on-board system 350 and/or the control circuit(s) 372 of feature detection system 370 of FIG. 3. In another embodiment, the method 900 may be performed by the control circuit 2052 of the training computing system 2050 of FIG. 10A. Although FIG. 9 depicts steps performed in a particular order for purposes of illustration and discussion, the methods of the present disclosure are not limited to the particularly illustrated order or arrangement. The various steps of the method 900 may be omitted, rearranged, combined, and/or adapted in various ways without deviating from the scope of the present disclosure. One or more portions of the method 900 may be implemented as an algorithm on the hardware components of the devices described herein. For example, the steps of method 900 may be implemented as operations/instructions that are executable by computing hardware.

In an embodiment, the method 900 may begin with or otherwise include a step 902, in which a computing system (e.g., the systems 350, 370, and/or 2050) obtains training data including at least one of map data, CAD data, satellite data, or sensor data. The training data may be obtained from static data stores, dynamically during operation of a vehicle (e.g., 200, 300, 402, 542), and/or from any other source. In embodiments where cameras on a vehicle (e.g., 200, 300, 402, 542) are respectively associated with a given image processing model (e.g., 802), the training data may be tailored to the associated camera.

Returning to FIG. 9, the method 900 may, in an embodiment, include a step 904, in which the computing system (e.g., the systems 350, 370, and/or 2050) generates a simulated model training environment feature detection the training data. The simulated model training environment may be or may include a two-dimensional and/or a three-dimensional simulated environment. The simulated environment may be or may include a model of a city, county, and/or other municipality including roadways, bridgeways and/or other travelways. The environment may include existing, static features that may be identified using machine learning models on a vehicle (e.g., 200, 300, 402, 542). The simulated environment simulates what the feature would look like as the simulated vehicle (e.g., 200, 300, 402, 542) drives along a given travelway.

Returning to FIG. 9, the method 900 may, in an embodiment, include a step 906, in which the computing system (e.g., the systems 350, 370, and/or 2050) trains one or more pre-trained machine-learned models feature detection one or more simulated drives using the simulated training environment. The one or more simulated drives may simulate how the travelway, including any features, would appear to sensors on a vehicle (e.g., 200, 300, 402, 542) as the vehicle (e.g., 200, 300, 402, 542) drives along a given travelway. Training may be performed on the simulated environment to facilitate the machine-learned models providing accurate outputs on real-world features. For the purposes of training, a model is created for cameras on the vehicle (e.g., 200, 300, 402, 542), motion data, vibration data, and/or other sensor data. During the simulated drive, these models receive data that resembles what the associated sensors would observe on the same travelway in the real world. The 2D/3D simulated environment training may include multiple test runs on a simulator, where a multitude of cameras are positioned on a simulated vehicle (e.g., 200, 300, 402, 542) and driven along particular stretches of travelway. After the models have reached a desired accuracy, machine learning weights, saved checkpoints, model structures, etc. may be recorded (e.g., for each camera position) and/or saved in a model store.

Returning to FIG. 9, the method 900 may, in an embodiment, include a step 908, in which the computing system (e.g., the systems 350, 370, and/or 2050) deploys the pre-trained machine-learned models to a vehicle (e.g., 200, 300, 402, 542), the pre-trained machine-learned model having pre-trained configuration parameters and pre-trained model data. Once training is completed, the model is deployed to one or more vehicles. The pre-trained models are then used to detect features in the real world on those vehicles. The models are continually trained and eventually used to produce a final deployable model, which is pushed to the vehicles.

Example Computing Systems

Figure 10A:
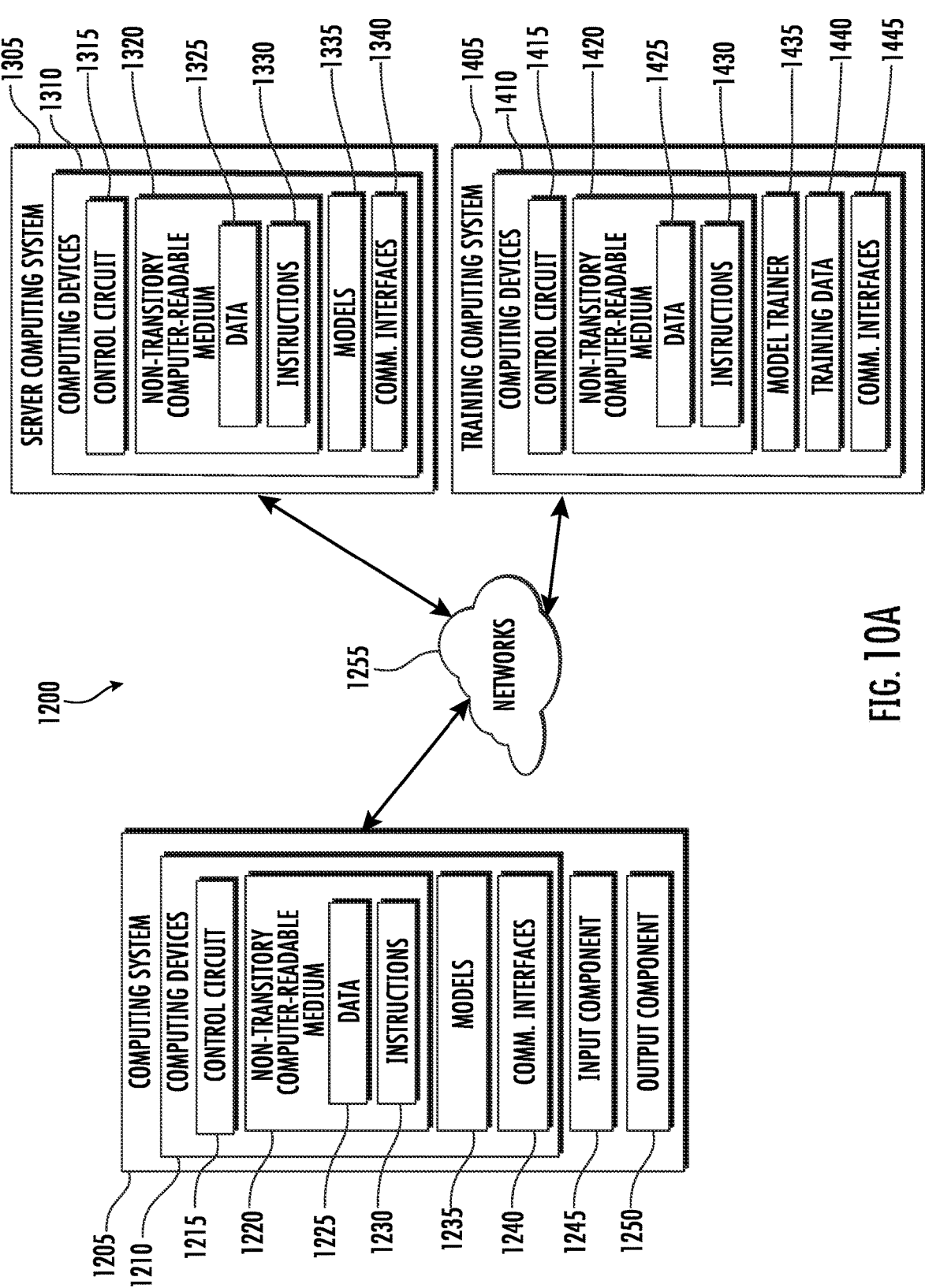
FIGS. 10A-10C illustrate block diagrams of computing systems according to example embodiments hereof.

FIG. 10A illustrates a block diagram of an example computing system 1200 according to an embodiment hereof. The system 1200 includes a computing system 1205 (e.g., a computing system onboard a vehicle or a feature detection system), a server computing system 1305 (e.g., a remote computing system, cloud computing platform), and a training computing system 1405 that are communicatively coupled over one or more networks 1255.

The computing system 1205 may include one or more computing devices 1210 or circuitry. For instance, the computing system 1205 may include a control circuit 1215 and a non-transitory computer-readable medium 1220, also referred to herein as memory. In an embodiment, the control circuit 1215 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 1215 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, or any other controller. In an embodiment, the control circuit 1215 may be programmed by one or more computer-readable or computer-executable instructions stored on the non-transitory computer-readable medium 1220.

In an embodiment, the non-transitory computer-readable medium 1220 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 1220 may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), and/or a memory stick.

The non-transitory computer-readable medium 1220 may store information that may be accessed by the control circuit 1215. For instance, the non-transitory computer-readable medium 1220 (e.g., memory devices) may store data 1225 that can be obtained, received, accessed, written, manipulated, created, and/or stored. The data 1225 can include, for instance, any of the data or information described herein. In some implementations, the computing system 1205 can obtain data from one or more memories that are remote from the computing system 1205.

The non-transitory computer-readable medium 1220 may also store computer-readable instructions 1230 that can be executed by the control circuit 1215. The instructions 1230 may be software written in any suitable programming language or can be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1215 to perform one or more functional tasks. The modules and computer-readable/executable instructions may be described as performing various operations or tasks when the control circuit 1215 or other hardware component is executing the modules or computer-readable instructions.

The instructions 1230 may be executed in logically and/or virtually separate threads on the control circuit 1215. For example, the non-transitory computer-readable medium 1220 can store instructions 1230 that when executed by the control circuit 1215 cause the control circuit 1215 to perform any of the operations, methods and/or processes described herein. In some cases, the non-transitory computer-readable medium 1220 may store computer-executable instructions or computer-readable instructions, such as instructions to perform at least a portion of the methods of FIG. 6, 7, or 9.

In an embodiment, the computing system 1205 may store or include one or more machine-learned models 1235. For example, the machine-learned models 1235 may be or may otherwise include various machine-learned models, such as the machine-learned models 360 of FIG. 3, the machine-learned image processing model 802 of FIG. 8A, the machine-learned vibration processing model 822 of FIG. 8B, and/or the machine-learned hybrid model 842 of FIG.

8C. In an embodiment, the machine-learned models 1235 may include an unsupervised learning model (e.g., for generating data clusters). In an embodiment, the machine-learned models 1235 may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

In an embodiment, the one or more machine-learned models 1235 may be received from the server computing system 1305 over networks 1255, stored in the computing system 1205 (e.g., non-transitory computer-readable medium 1220), and then used or otherwise implemented by the control circuit 1215. In an embodiment, the computing system 1205 may implement multiple parallel instances of a single model.

Additionally, or alternatively, one or more machine-learned models 1235 may be included in or otherwise stored and implemented by the server computing system 1305 that communicates with the computing system 1205 according to a client-server relationship. For example, the machine-learned models 1235 may be implemented by the server computing system 1305 as a portion of a web service. Thus, one or more models 1235 may be stored and implemented at the computing system 1205 and/or one or more models 1235 may be stored and implemented at the server computing system 1305.

The computing system 1205 may include a communication interface 1240. The communication interface 1240 may be used to communicate with one or more other system(s). The communication interface 1240 may include any circuits, components, software, etc. for communicating via one or more networks (e.g., networks 1255). In some implementations, the communication interface 1240 may include for example, one or more of a communications controller, receiver, transceiver, transmitter, port, conductors, software and/or hardware for communicating data/information.

The computing system 1205 may also include one or more user input components 1245 that receives user input. For example, the user input component 1245 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The computing system 1205 may include one or more output components 1250. The output components 1250 can include hardware and/or software for audibly or visual producing content. For instance, the output components 1250 can include one or more speaker(s), earpiece(s), headset(s), handset(s), etc. The output components 1250 can include a display device, which can include hardware for displaying a user interface and/or messages for a user. By way of example, the output component 1250 can include a display screen, CRT, LCD, plasma screen, touch screen, TV, projector, tablet, and/or other suitable display components.

The server computing system 1305 can include one or more computing devices 1310. In an embodiment, the server computing system 1305 may include or is otherwise implemented by one or more server computing devices. In instances in which the server computing system 1305 includes plural server computing devices, such server computing devices may operate according to sequential computing architectures, parallel computing architectures, or some combination thereof.

The server computing system 1305 may include a control circuit 1315 and a non-transitory computer-readable medium 1320, also referred to herein as memory 1320. In an embodiment, the control circuit 1315 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1315 may be programmed by one or more computer-readable or computer-executable instructions stored on the non-transitory computer-readable medium 1320.

In an embodiment, the non-transitory computer-readable medium 1320 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), and/or a memory stick.

The non-transitory computer-readable medium 1320 may store information that may be accessed by the control circuit 1315. For instance, the non-transitory computer-readable medium 1320 (e.g., memory devices) may store data 1325 that can be obtained, received, accessed, written, manipulated, created, and/or stored. The data 1325 can include, for instance, any of the data or information described herein. In some implementations, the server computing system 1305 can obtain data from one or more memories that are remote from the server computing system 1305.

The non-transitory computer-readable medium 1320 may also store computer-readable instructions 1330 that can be executed by the control circuit 1315. The instructions 1330 may be software written in any suitable programming language or can be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1315 to perform one or more functional tasks. The modules and computer-readable/executable instructions may be described as performing various operations or tasks when the control circuit 1315 or other hardware component is executing the modules or computer-readable instructions.

The instructions 1330 may be executed in logically and/or virtually separate threads on the control circuit 1315. For example, the non-transitory computer-readable medium

1320 can store instructions 1330 that when executed by the control circuit 1315 cause the control circuit 1315 to perform any of the operations, methods and/or processes described herein. In some cases, the non-transitory computer-readable medium 1320 may store computer-executable instructions or computer-readable instructions, such as instructions to perform at least a portion of the methods of FIG. 6, 7, or 9.

The server computing system 1305 may store or otherwise include one or more machine-learned models 1335, such as the machine-learned models 360 of FIG. 3, the machine-learned image processing model 802 of FIG. 8A, the machine-learned vibration processing model 822 of FIG. 8B, and/or the machine-learned hybrid model 842 of FIG. 8C. The machine-learned models 1335 may include or be the same as the models 1235 stored in computing system 1205. In an embodiment, the machine-learned models 1335 can include an unsupervised learning model (e.g., for generating data clusters). In an embodiment, the machine-learned models 1335 can include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

The server computing system 1305 may include a communication interface 1340. The communication interface 1340 may be used to communicate with one or more other system(s). The communication interface 1340 may include any circuits, components, software, etc. for communicating via one or more networks (e.g., networks 1255). In some implementations, the communication interface 1340 may include for example, one or more of a communications controller, receiver, transceiver, transmitter, port, conductors, software and/or hardware for communicating data/information.

The computing system 1205 and/or the server computing system 1305 may train the models 1235, 1335 via interaction with the training computing system 1405 that is communicatively coupled over the networks 1255. The training computing system 1405 may be separate from the server computing system 1305 or may be a portion of the server computing system 1305.

The training computing system 1405 may include one or more computing devices 1410. In an embodiment, the training computing system 1405 can include or is otherwise implemented by one or more server computing devices. In instances in which the training computing system 1405 includes plural server computing devices, such server computing devices may operate according to sequential computing architectures, parallel computing architectures, or some combination thereof.

The training computing system 1405 may include a control circuit 1415 and a non-transitory computer-readable medium 1420, also referred to herein as memory 1420. In an embodiment, the control circuit 1415 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 1415 may be programmed by one or more computer-readable or computer-executable instructions stored on the non-transitory computer-readable medium 1420.

In an embodiment, the non-transitory computer-readable medium 1420 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid-state drive (SDD) or solid-state integrated memory, a random-access memory (RAM), a read-only memory (ROM), an erasable programmable read-only memory (EPROM or Flash memory), a static random-access memory (SRAM), dynamic random-access memory (DRAM), a portable compact disc read-only memory (CD-ROM), a digital versatile disk (DVD), and/or a memory stick.

The non-transitory computer-readable medium 1420 may store information that may be accessed by the control circuit 1415. For instance, the non-transitory computer-readable medium 1420 (e.g., memory devices) may store data 1425 that can be obtained, received, accessed, written, manipulated, created, and/or stored. The data 1425 can include, for instance, any of the data or information described herein, such as data relating to a simulated environment. In some implementations, the training computing system 1405 can obtain data from one or more memories that are remote from the training computing system 1405.

The non-transitory computer-readable medium 1420 may also store computer-readable instructions 1430 that can be executed by the control circuit 1415. The instructions 1430 may be software written in any suitable programming language or can be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 1415 to perform one or more functional tasks. The modules and computer-readable/executable instructions may be described as performing various operations or tasks when the control circuit 1415 or other hardware component is executing the modules or computer-readable instructions.

The instructions 1430 may be executed in logically and/or virtually separate threads on the control circuit 1415. For example, the non-transitory computer-readable medium 1420 can store instructions 1430 that when executed by the control circuit 1415 cause the control circuit 1415 to perform any of the operations, methods and/or processes described herein. In some cases, the non-transitory computer-readable medium 1420 may store computer-executable instructions or computer-readable instructions, such as instructions to perform at least a portion of the methods of FIG. 6, 7, or 9.

The training computing system 1405 may include a model trainer 1435 that trains the machine-learned models 1235, 1335 stored at the computing system 1205 and/or the server computing system 1305 using various training or learning techniques. For example, the models 1235, 1335 (e.g., a machine-learned clustering model) can be trained using a simulated environment technique in which a simulated representation of a travelway created from existing sensor data and/or motion data is used to train the models 1235, 1335.

The model trainer can train the models 1235, 1335 (e.g., a machine-learned clustering model) in an unsupervised fashion. As such, the model(s) can be effectively trained using unlabeled data for particular applications or problem domains (e.g., generating user-activity clusters), which improves performance and adaptability of the models. Furthermore, the models 1235, 1335 can facilitate the discovery of natural partitions or clusters in the data without requiring a pre-existing embedding to seed the clustering objective. As a result, such models can be more effectively trained to cluster complex data with less manual human intervention (e.g., labeling, selecting a pre-existing embedding, etc.).

The computing system can modify parameters of the models 1235, 1335 based on the loss function such that the models can be effectively trained for specific applications in an unsupervised manner without labeled data. This can be particularly useful for effectively training a model to cluster complex, unlabeled data sets.

The model trainer 1435 can utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 1435 may perform a number of generalization techniques (e.g., weight decays, drop-outs, etc.) to improve the generalization capability of a model being trained. In particular, the model trainer 1435 may train the machine-learned models 1235, 1335 based on a set of training data 1440.

The training data 1440 can include unlabeled training data for training in an unsupervised fashion. The training data 1440 can include unlabeled sets of data indicative of training user-selected settings and data indicative of training observed conditions, for a particular vehicle function.

In an embodiment, if the user has provided consent/authorization, the training examples may be provided by the computing system 1205. Thus, in such implementations, a model 1235 provided to the computing system 1205 may be trained by the training computing system 1405 in a manner to personalize the model 1235.

The model trainer 1435 may include computer logic utilized to provide desired functionality. The model trainer 1435 may be implemented in hardware, firmware, and/or software controlling a general-purpose processor. For example, in an embodiment, the model trainer 1435 may include program files stored on a storage device, loaded into a memory and executed by one or more processors. In other implementations, the model trainer 1435 may include one or more sets of computer-executable instructions that are stored in a tangible computer-readable storage medium such as RAM, hard disk, or optical or magnetic media.

The training computing system 1405 may include a communication interface 1445. The communication interface 1445 may be used to communicate with one or more other system(s). The communication interface 1445 may include any circuits, components, software, etc. for communicating via one or more networks (e.g., networks 1255). In some implementations, the communication interface 1445 may include for example, one or more of a communications controller, receiver, transceiver, transmitter, port, conductors, software and/or hardware for communicating data/information.

The networks 1255 may be any type of communications network, such as a local area network (e.g., intranet), wide area network (e.g., Internet), or some combination thereof and may include any number of wired or wireless links. In general, communication over the network 1255 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may have various types of input data and/or combinations thereof, representing data available to sensors and/or other systems onboard a vehicle. Input data can include, for example, latent encoding data (e.g., a latent space representation of an input, etc.), statistical data (e.g., data computed and/or calculated from some other data source), sensor data (e.g., raw and/or processed data captured by a sensor of the vehicle), or other types of data.

The machine-learned models described in this specification may have various types of input data and/or combinations thereof, representing data available to sensors and/or other systems onboard a vehicle.

In an embodiment, the input to the machine-learned model(s) of the present disclosure may be image data. The machine-learned model(s) may process the image data to generate an output. As an example, the machine-learned model(s) may process the image data to generate an image recognition output (e.g., a recognition of the image data, a latent embedding of the image data, an encoded representation of the image data, a hash of the image data, etc.). As another example, the machine-learned model(s) may process the image data to generate an image segmentation output. As another example, the machine-learned model(s) may process the image data to generate an image classification output. As another example, the machine-learned model(s) may process the image data to generate an image data modification output (e.g., an alteration of the image data, etc.). As another example, the machine-learned model(s) may process the image data to generate an encoded image data output (e.g., an encoded and/or compressed representation of the image data, etc.). As another example, the machine-learned model(s) may process the image data to generate an upscaled image data output. As another example, the machine-learned model(s) may process the image data to generate a prediction output.

In an embodiment, the input to the machine-learned model(s) of the present disclosure may be text or natural language data (e.g., text or natural language data visible on a road sign). The machine-learned model(s) may process the text or natural language data to generate an output. As an example, the machine-learned model(s) may process the natural language data to generate a language encoding output. As another example, the machine-learned model(s) may process the text or natural language data to generate a latent text embedding output. As another example, the machine-learned model(s) may process the text or natural language data to generate a translation output. As another example, the machine-learned model(s) may process the text or natural language data to generate a classification output. As another example, the machine-learned model(s) may process the text or natural language data to generate a textual segmentation output. As another example, the machine-learned model(s) may process the text or natural language data to generate a semantic intent output. As another example, the machine-learned model(s) may process the text or natural language data to generate an upscaled text or natural language output (e.g., text or natural language data that is higher quality than the input text or natural language, etc.). As another example, the machine-learned model(s) may process the text or natural language data to generate a prediction output.

In an embodiment, the input to the machine-learned model(s) of the present disclosure may be latent encoding data (e.g., a latent space representation of an input, etc.). The machine-learned model(s) may process the latent encoding data to generate an output. As an example, the machine-learned model(s) may process the latent encoding data to generate a recognition output. As another example, the machine-learned model(s) may process the latent encoding data to generate a reconstruction output. As another example, the machine-learned model(s) may process the latent encoding data to generate a search output. As another example, the machine-learned model(s) may process the latent encoding data to generate a reclustering output. As another example, the machine-learned model(s) may process the latent encoding data to generate a prediction output.

In an embodiment, the input to the machine-learned model(s) of the present disclosure may be statistical data. Statistical data may be, represent, or otherwise include data computed and/or calculated from some other data source. The machine-learned model(s) may process the statistical data to generate an output. As an example, the machine-learned model(s) may process the statistical data to generate a recognition output. As another example, the machine-learned model(s) may process the statistical data to generate a prediction output. As another example, the machine-learned model(s) may process the statistical data to generate a classification output. As another example, the machine-learned model(s) may process the statistical data to generate a segmentation output. As another example, the machine-learned model(s) may process the statistical data to generate a visualization output. As another example, the machine-learned model(s) may process the statistical data to generate a diagnostic output.

In an embodiment, the input to the machine-learned model(s) of the present disclosure may be sensor data. The machine-learned model(s) may process the sensor data to generate an output. As an example, the machine-learned model(s) may process the sensor data to generate a recognition output. As another example, the machine-learned model(s) may process the sensor data to generate a prediction output. As another example, the machine-learned model(s) may process the sensor data to generate a classification output. As another example, the machine-learned model(s) may process the sensor data to generate a segmentation output. As another example, the machine-learned model(s) may process the sensor data to generate a visualization output. As another example, the machine-learned model(s) may process the sensor data to generate a diagnostic output. As another example, the machine-learned model(s) may process the sensor data to generate a detection output.

In some cases, the machine-learned model(s) may be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task may be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task may be image segmentation, where the image processing output defines, for each pixel in the one or more images, a respective likelihood for each category in a predetermined set of categories. For example, the set of categories may be foreground and background. As another example, the set of categories may be object classes. As another example, the image processing task may be depth estimation, where the image processing output defines, for each pixel in the one or more images, a respective depth value. As another example, the image processing task may be motion estimation, where the network input includes multiple images, and the image processing output defines, for each pixel of one of the input images, a motion of the scene depicted at the pixel between the images in the network input.

FIG. 10A illustrates one example computing system that may be used to implement the present disclosure. Other computing systems may be used as well. For example, in an embodiment, the computing system 1205 may include the model trainer 1435 and the training data 1440. In such implementations, the models 1235 may be both trained and used locally at the computing system 1205. In some of such implementations, the computing system 1205 may implement the model trainer 1435 to personalize the models 1235 based on user-specific data.

Figure 10B:
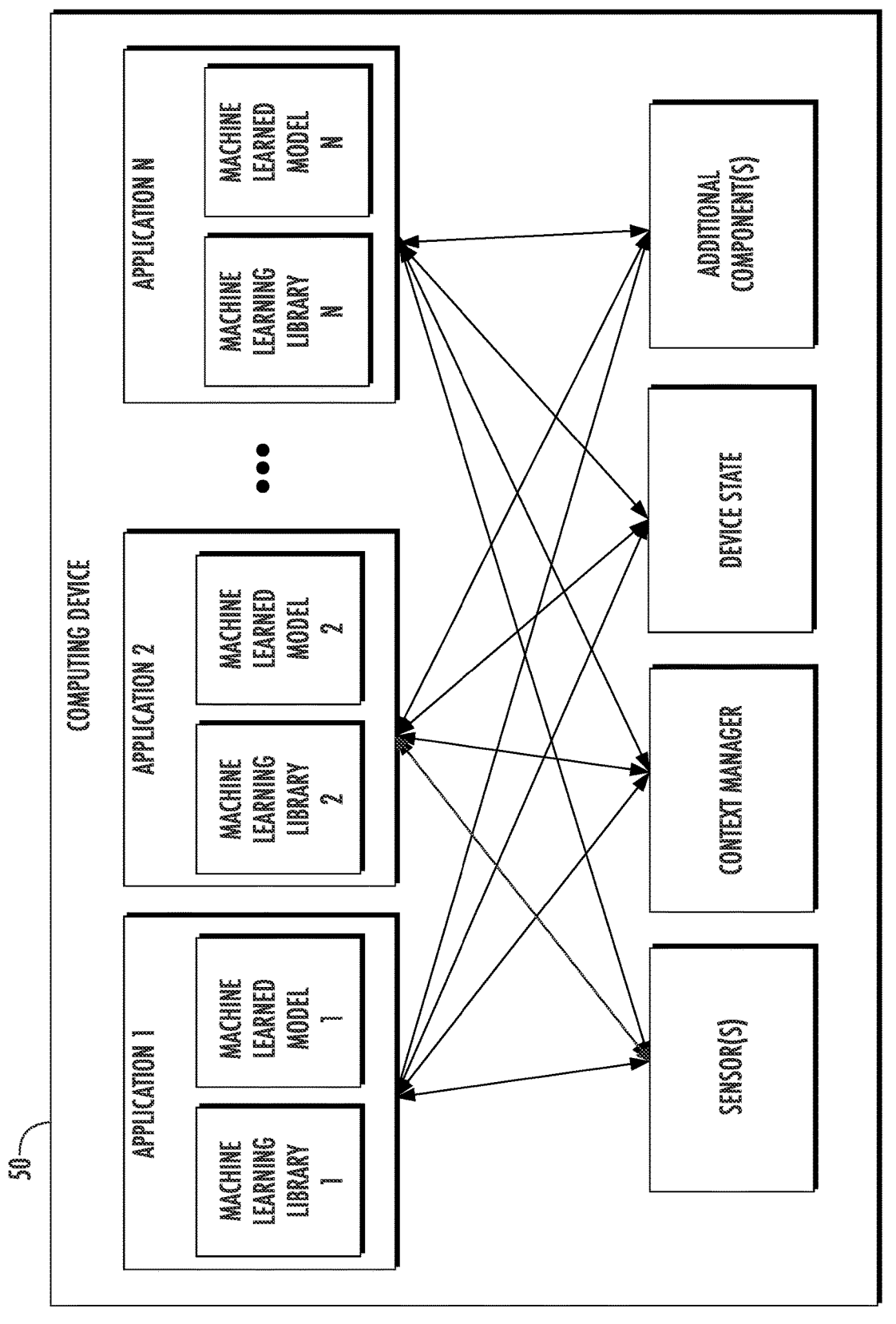

FIG. 10B depicts a block diagram of an example computing device 50 that performs operations for feature detection according to example embodiments hereof. The computing device 50 may be a vehicle computing device or a server computing device.

The computing device 50 may include a number of applications (e.g., applications 20 through N). Each application may contain its own machine learning library and machine-learned model(s). For example, each application may include a machine-learned model. Example applications may include a text messaging application, an email application, a dictation application, a virtual keyboard application, a browser application, etc. As one example, the machine-learning library may be the model repository 390 or machine-learned model store 393 of FIG. 3.

As illustrated in FIG. 10B, each application may communicate with a number of other components of the computing device, such as, for example, one or more sensors, a context manager, a device state component, and/or additional components. In an embodiment, each application may communicate with each device component using an API (e.g., a public API). In an embodiment, the API used by each application may be specific to that application.

Figure 10C:
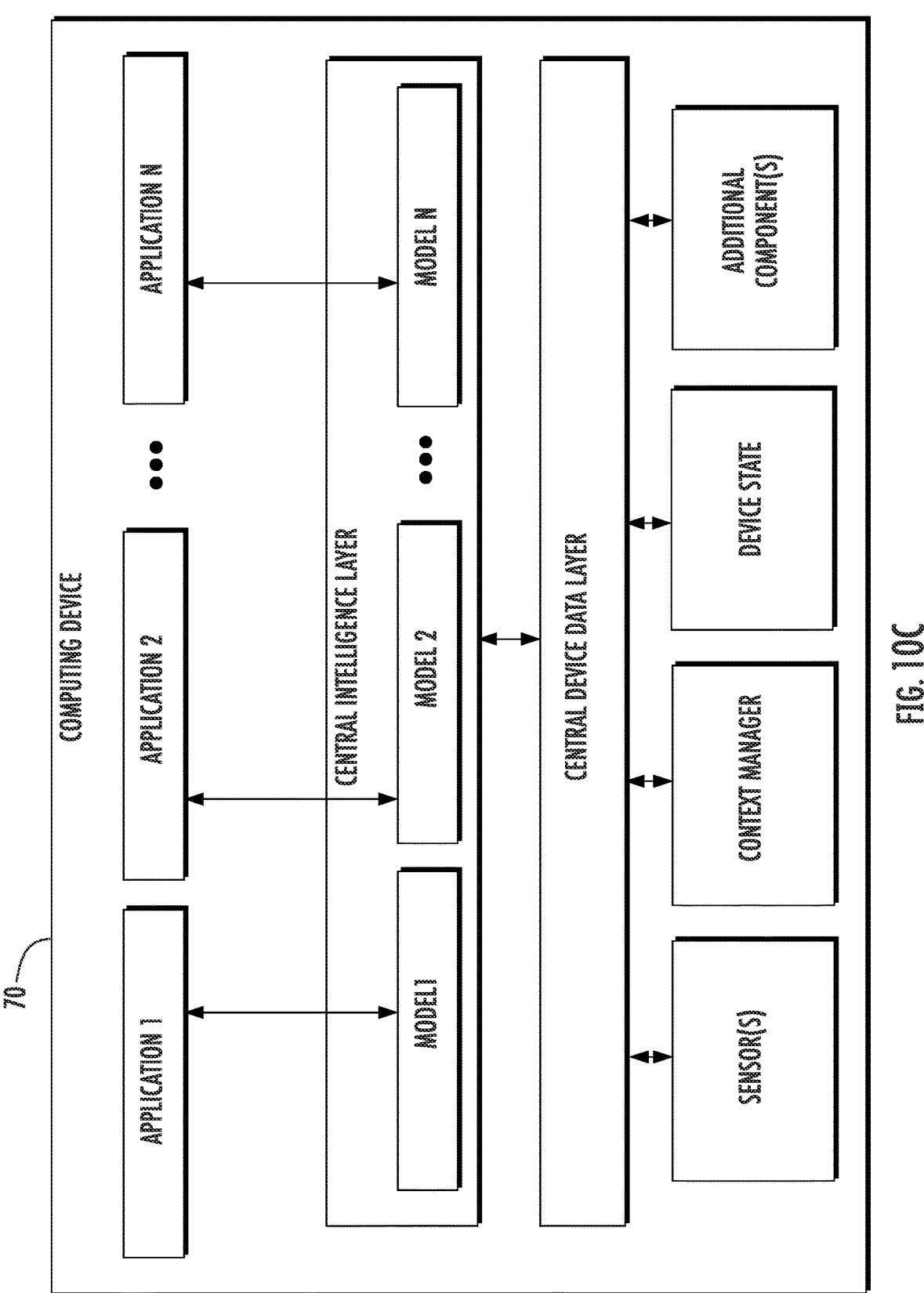

FIG. 10C depicts a block diagram of an example computing device 70 that performs operations for feature detection according to example embodiments hereof. The computing device 70 may be a vehicle computing device or a server computing device. For example, the computing device 70 may represent a feature detection system such as the feature detection system 100 of FIG. 1.

The computing device 70 may include a number of applications (e.g., applications 1 through N). Each application may be in communication with a central intelligence layer. Example applications may include a text messaging application, an email application, a dictation application, a virtual keyboard application, a browser application, etc. In an embodiment, each application may communicate with the central intelligence layer (and model(s) stored therein) using an API (e.g., a common API across all applications). As an example, a feature detection system may communicate with one or more services, such as a service utilized by a municipal transportation customer system to provide municipal travelway data. The API may facilitate transfer of the municipal travelway data between the municipal transportation customer system and the central intelligence layer of the feature detection system.

The central intelligence layer may include a number of machine-learned models such as those described herein. For example, as illustrated in FIG. 10C, a respective machine-learned model may be provided for each application and managed by the central intelligence layer. In other implementations, two or more applications may share a single machine-learned model. For example, in an embodiment, the central intelligence layer may provide a single model for all of the applications. In an embodiment, the central intelligence layer may be included within or otherwise implemented by an operating system of the computing device 70.

The central intelligence layer may communicate with a central device data layer. The central device data layer may be a centralized repository of data for the computing device 70. As illustrated in FIG. 10C, the central device data layer may communicate with a number of other components of the computing device, such as, for example, one or more sensors, a context manager, a device state component, and/or additional components. In an embodiment, the central device data layer may communicate with each device component using an API (e.g., a private API). For example, the central intelligence layer may communicate with device components of vehicles described herein.

ADDITIONAL DISCUSSION OF VARIOUS EMBODIMENTS

Embodiment 1 relates to a computing system. The computing system may include a control circuit configured to perform operations. The operations may include receiving, via one or more sensors of a vehicle, sensor data indicative of a feature within a travelway on which the vehicle is traveling and motion data indicative of a movement of a component of the vehicle associated with the feature. The operations may further include receiving, via a positioning system of the vehicle, positioning data of the vehicle, the positioning data being associated with a position of the vehicle within a first segment of the travelway. The operations may further include obtaining travelway data for the first segment based on the positioning data. The operations may further include, based on the sensor data, the motion data, and the travelway data, generating, using one or more machine-learned models, an output that is indicative of a classification of the feature within the travelway and a location of the feature within the first segment of the travelway. The operations may further include transmitting, to a server that is remote from the vehicle, the output indicative of the classification of the feature and the location of the feature within the first segment.

Embodiment 2 includes the computing system of Embodiment 1. In this embodiment, the feature indicated by the sensor data comprises a surface defect on a surface of the travelway and the component associated with the motion data comprises a wheel in contact with the surface of the travelway.

Embodiment 3 includes the computing system of one of Embodiment 1 or 2. In this embodiment, the sensor data comprises image data captured via one or more cameras of the vehicle, and the one or more machine-learned models comprise a machine-learned image processing model.

Embodiment 4 includes the computing system of any one of Embodiments 1 through 3. In this embodiment, the image data includes a first image obtained via a front camera, the front camera positioned at a front location of the vehicle and facing a forward direction relative to the vehicle, and a second image obtained via a rear camera, the rear camera positioned at a rear location of the vehicle and facing a rear direction relative to the vehicle.

Embodiment 5 includes the computing system of any one of Embodiments 1 through 4. In this embodiment, the image processing model is a mask region-based convolutional neural network (R-CNN) that is trained to process the image data to determine at least one of: (i) a location of the feature, (ii) a type of the feature, (iii) a width parameter of the feature, or (iv) a depth parameter of the feature.

Embodiment 6 includes the computing system of any one of Embodiments 1 through 5. In this embodiment, the motion data comprises vibration data indicative of a vibration of the component of the vehicle, and wherein the one or more machine-learned models comprise a machine-learned vibration processing model.

Embodiment 7 includes the computing system of any one of Embodiments 1 through 6. In this embodiment, the machine-learned vibration processing model is a convolutional neural network (CNN) that is trained to process the vibration data to determine an impact force of the vehicle physically contacting the feature, and wherein the machine-learned vibration processing model is trained to use the impact force to determine at least one of: (i) a location of the feature, (ii) a type of the feature, (iii) a width parameter of the feature, or (iv) a depth parameter of the feature.

Embodiment 8 includes the computing system of any one of Embodiments 1 through 7. In this embodiment, the vibration data comprises a first vibration value obtained via a first shock sensor associated with a first wheel of the vehicle, and a second vibration value obtained via a second shock sensor associated with a second wheel of the vehicle.

Embodiment 9 includes the computing system of any one of Embodiments 1 through 8. In this embodiment, the motion data comprises acceleration data of the vehicle captured via an acceleration sensor of the vehicle.

Embodiment 10 includes the computing system of any one of Embodiments 1 through 9. In this embodiment, the one or more machine-learned models comprise a machine-learned hybrid model that is trained to generate the classification of the feature based on an event defined by the sensor data and the motion data.

Embodiment 11 includes the computing system of any one of Embodiments 1 through 10. In this embodiment, an initiation of the event is based on a time at which the feature is identified by a machine-learned image processing model based on the sensor data, and a termination of the event is based on a time at which the feature is identified by a machine-learned vibration processing model based on the motion data.

Embodiment 12 includes the computing system of any one of Embodiments 1 through 11. In this embodiment, the server to which the computing system transmits the output is configured to receive, from a second vehicle, a second classification of the feature located in the first segment, and the travelway data for the first segment is updated based on an aggregation of the classification and the second classification.

Embodiment 13 includes the computing system of any one of Embodiments 1 through 12. In this embodiment, the server to which the computing system transmits the output is configured to perform at least one of the following: (i) transmit data indicative of the feature to a system for repair of the feature; (ii) transmit data indicative of a notification of the feature to a second vehicle; (iii) transmit data indicative of a route to avoid the feature; or (iv) verify that the feature has been addressed.

Embodiment 14 includes the computing system of any one of Embodiments 1 through 13. In this embodiment, the control circuit is further configured to receive updated travelway data indicative of the classification of the feature and the location of the feature.

Embodiment 15 relates to a computer-implemented method. The computer-implemented method may include receiving, via one or more sensors of a vehicle, sensor data indicative of a feature within a travelway on which the vehicle is traveling and motion data indicative of a movement of a component of the vehicle associated with the feature. The computer-implemented method may further include receiving, via a positioning system of the vehicle, positioning data of the vehicle, the positioning data being associated with a position of the vehicle within a first segment of the travelway. The computer-implemented method may further include obtaining travelway data for the first segment based on the positioning data. The computer-implemented method may further include, based on the sensor data, the motion data, and the travelway data, generating, using one or more machine-learned models, an output that is indicative of a classification of the feature within the travelway and a location of the feature within the first segment of the travelway. The computer-implemented method may further include transmitting, to a server that is remote from the vehicle, the output indicative of the classification of the feature and the location of the feature within the first segment.

Embodiment 16 includes the computer-implemented method of Embodiment 15. In this embodiment, the feature indicated by the sensor data comprises a surface defect on a surface of the travelway, and the component associated with the motion data comprises a wheel in contact with the surface of the travelway.

Embodiment 17 includes the computer-implemented method of one of Embodiment 15 or 16. In this embodiment, the sensor data comprises image data captured via one or more cameras of the vehicle, and wherein the motion data comprises at least one of: (i) vibration data captured via one or more motion sensors of the vehicle, or (ii) acceleration data captured via one or more acceleration sensors of the vehicle.

Embodiment 18 includes the computer-implemented method of any one of Embodiments 15 through 17. In this embodiment, the one or more machine-learned models comprise a first machine-learned model trained to identify the feature based on the sensor data, and a second machine-learned model trained to identify the feature based on the motion data.

Embodiment 19 includes the computer-implemented method of any one of Embodiments 15 through 18. In this embodiment, the one or more machine-learned models further comprise a third machine-learned model trained to generate the classification of the feature based on an output of the first machine-learned model and an output of the second machine-learned model.

Embodiment 20 relates to one or more non-transitory computer-readable media that store instructions that are executable by a control circuit. The instructions, when executed, may cause the control circuit to perform operations. The operations may include receiving, via one or more sensors of a vehicle, sensor data indicative of a feature within a travelway on which the vehicle is traveling and motion data indicative of a movement of a component of the vehicle associated with the feature. The operations may further include receiving, via a positioning system of the vehicle, positioning data of the vehicle, the positioning data being associated with a position of the vehicle within a first segment of the travelway. The operations may further include obtaining travelway data for the first segment based on the positioning data. The operations may further include, based on the sensor data, the motion data, and the travelway data, generating, using one or more machine-learned models, an output that is indicative of a classification of the feature within the travelway and a location of the feature within the first segment of the travelway. The operations may further include transmitting, to a server that is remote from the vehicle, the output indicative of the classification of the feature and the location of the feature within the first segment.

ADDITIONAL DISCLOSURE

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system comprising:
a control circuit configured to:
receive, via one or more sensors of a vehicle, sensor data indicative of a feature within a travelway on which the vehicle is traveling and motion data indicative of a movement of one or more wheels of the vehicle associated with the feature, wherein the motion data comprises vibration data of the one or more wheels of the vehicle detected by one or more shock sensors;
receive, via a positioning system of the vehicle, positioning data of the vehicle, the positioning data being associated with a position of the vehicle within a first segment of the travelway;
obtain travelway data for the first segment based on the positioning data;
based on the sensor data, the motion data, and the travelway data, generate, using one or more machine-learned models, an output that is indicative of: a classification of the feature within the travelway and a location of the feature within the first segment of the travelway, wherein at least one of the one or more machine-learned models are trained to process the vibration data to determine an event sequence of the one or more wheels of the vehicle physically contacting the feature and wherein the classification of the feature comprises a type of the feature determined based on a profile of the event sequence; and
transmit, to a server that is remote from the vehicle, the output indicative of the classification of the feature and the location of the feature within the first segment.

2. The computing system of claim 1, wherein the feature indicated by the sensor data comprises a surface defect on a surface of the travelway.

3. The computing system of claim 1, wherein the sensor data comprises image data captured via one or more cameras of the vehicle, and wherein the one or more machine-learned models comprise a machine-learned image processing model.

4. The computing system of claim 3, wherein the image data includes a first image obtained via a front camera, the front camera positioned at a front location of the vehicle and facing a forward direction relative to the vehicle, and a second image obtained via a rear camera, the rear camera positioned at a rear location of the vehicle and facing a rear direction relative to the vehicle.

5. The computing system of claim 3, wherein the machine-learned image processing model is a mask region-based convolutional neural network (R-CNN) that is trained to process the image data to determine at least one of: (i) a location of the feature, (ii) the type of the feature, (iii) a width parameter of the feature, or (iv) a depth parameter of the feature.

6. The computing system of claim 1, wherein the one or more machine-learned models comprise a machine-learned vibration processing model.

7. The computing system of claim 6, wherein the machine-learned vibration processing model is a convolutional neural network (CNN) that is trained to further process the vibration data to determine an impact force of the vehicle physically contacting the feature, and wherein the machine-learned vibration processing model is trained to use the impact force to determine at least one of: (i) a location of the feature, (ii) the type of the feature, (iii) a width parameter of the feature, or (iv) a depth parameter of the feature.

8. The computing system of claim 6, wherein the vibration data comprises a first vibration value obtained via a first shock sensor associated with a first wheel of the vehicle, and a second vibration value obtained via a second shock sensor associated with a second wheel of the vehicle, and the vibration data is used to generate the classification of the feature within the travelway and the location of the feature.

9. The computing system of claim 1, wherein the motion data comprises acceleration data of the vehicle captured via an acceleration sensor of the vehicle.

10. The computing system of claim 1, wherein the one or more machine-learned models comprise a machine-learned hybrid model that is trained to generate the classification of the feature based on a detection event defined by the sensor data and the motion data.

11. The computing system of claim 10, wherein an initiation of the detection event is based on a time at which the feature is identified by a machine-learned image processing model based on the sensor data, and wherein a termination of the event is based on a time at which the feature is identified by a machine-learned vibration processing model based on the motion data.

12. The computing system of claim 1, wherein the server to which the computing system transmits the output is configured to receive, from a second vehicle, a second classification of the feature located in the first segment, and wherein the travelway data for the first segment is updated based on an aggregation of the classification and the second classification.

13. The computing system of claim 1, wherein the server to which the computing system transmits the output is configured to perform at least one of the following: (i) transmit data indicative of the feature to a system for repair of the feature; (ii) transmit data indicative of a notification of the feature to a second vehicle; (iii) transmit data indicative of a route to avoid the feature; or (iv) verify that the feature has been addressed.

14. The computing system of claim 1, wherein the control circuit is further configured to:

receive updated travelway data indicative of the classification of the feature and the location of the feature.

15. A computer-implemented method comprising:

receiving, via one or more sensors of a vehicle, sensor data indicative of a feature within a travelway on which the vehicle is traveling and motion data indicative of a movement of one or more wheels of the vehicle associated with the feature, wherein the motion data comprises vibration data of the one or more wheels of the vehicle detected by one or more shock sensors;

receiving, via a positioning system of the vehicle, positioning data of the vehicle, the positioning data being associated with a position of the vehicle within a first segment of the travelway;

obtain travelway data for the first segment based on the positioning data;

based on the sensor data, the motion data, and the travelway data, generate, using one or more machine-learned models, an output that is indicative of: a classification of the feature within the travelway and a location of the feature within the first segment of the travelway, wherein at least one of the one or more machine-learned models are trained to process the vibration data to determine an event sequence of the one or more wheels of the vehicle physically contacting the feature and wherein the classification of the feature comprises a type of the feature determined based on a profile of the event sequence; and transmit, to a server that is remote from the vehicle, the output indicative of the classification of the feature and the location of the feature within the first segment.

16. The computer-implemented method of claim 15, wherein the feature indicated by the sensor data comprises a surface defect on a surface of the travelway.

17. The computer-implemented method of claim 15, wherein the sensor data comprises image data captured via one or more cameras of the vehicle.

18. The computer-implemented method of claim 15, wherein the one or more machine-learned models comprise a first machine-learned model trained to identify the feature based on the sensor data, and a second machine-learned model trained to identify the feature based on the motion data.

19. The computer-implemented method of claim 18, wherein the one or more machine-learned models further comprise a third machine-learned model trained to generate the classification of the feature based on an output of the first machine-learned model and an output of the second machine-learned model.

20. One or more non-transitory computer-readable media that store instructions that are executable by a control circuit to:

receive, via one or more sensors of a vehicle, sensor data indicative of a feature within a travelway on which the vehicle is traveling and motion data indicative of a movement of one or more wheels of the vehicle associated with the feature, wherein the motion data comprises vibration data of the one or more wheels of the vehicle detected by one or more shock sensors;

receive, via a positioning system of the vehicle, positioning data of the vehicle, the positioning data being associated with a position of the vehicle within a first segment of the travelway;

obtain travelway data for the first segment based on the positioning data;

based on the sensor data, the motion data, and the travelway data, generate, using one or more machine-learned models, an output that is indicative of: a classification of the feature within the travelway and a location of the feature within the first segment of the travelway, wherein at least one of the one or more machine-learned models are trained to process the vibration data to determine an event sequence of the one or more wheels of the vehicle physically contacting the feature and wherein the classification of the feature comprises a type of the feature determined based on a profile of the event sequence; and transmit, to a server that is remote from the vehicle, the output indicative of the classification of the feature and the location of the feature within the first segment.

* * * * *